(12) United States Patent
Craner

(10) Patent No.: US 8,402,488 B2
(45) Date of Patent: Mar. 19, 2013

(54) SYSTEMS AND METHODS FOR CREATING CUSTOM VIDEO MOSAIC PAGES WITH LOCAL CONTENT

(75) Inventor: Michael L. Craner, Exton, PA (US)

(73) Assignee: Rovi Guides, Inc, Santa Clara, CA (US)

( * ) Notice: Subject to any disclaimer, the term of this patent is extended or adjusted under 35 U.S.C. 154(b) by 0 days.

(21) Appl. No.: 12/539,367

(22) Filed: Aug. 11, 2009

(65) Prior Publication Data

US 2010/0122294 A1  May 13, 2010

Related U.S. Application Data

(63) Continuation of application No. 11/647,787, filed on Dec. 28, 2006, now abandoned.

(51) Int. Cl.
*G06F 3/00* (2006.01)
*G06F 13/00* (2006.01)
*H04N 5/445* (2011.01)

(52) U.S. Cl. ............ 725/45; 725/41; 725/42; 725/43; 725/46; 725/47; 725/48; 725/49; 725/50; 725/52; 725/61; 348/705; 348/706; 348/584; 715/719; 715/781; 715/841; 715/838

(58) Field of Classification Search .............. 725/41–50, 725/52, 56, 59, 61; 715/719, 781, 841, 838; 348/705–706, 584
See application file for complete search history.

(56) References Cited

U.S. PATENT DOCUMENTS

| | | |
|---|---|---|
| 2,700,065 A | 1/1955 | Evans |
| 2,851,550 A | 9/1958 | Searcy |
| 2,856,474 A | 10/1958 | Norris |
| 3,879,332 A | 4/1975 | Leone |
| 4,001,554 A | 1/1977 | Hall et al. |
| 4,012,583 A | 3/1977 | Kramer |
| 4,015,139 A | 3/1977 | Cleary et al. |
| 4,079,419 A | 3/1978 | Siegle et al. |
| 4,081,753 A | 3/1978 | Miller |
| 4,081,754 A | 3/1978 | Jackson |
| 4,156,850 A | 5/1979 | Beyers, Jr. |
| 4,162,513 A | 7/1979 | Beyers, Jr. et al. |
| 4,163,254 A | 7/1979 | Block et al. |
| 4,167,658 A | 9/1979 | Sherman |
| 4,170,782 A | 10/1979 | Miller |
| 4,225,884 A | 9/1980 | Block et al. |
| 4,228,543 A | 10/1980 | Jackson |

(Continued)

FOREIGN PATENT DOCUMENTS

| | | |
|---|---|---|
| AU | 21592/88 | 3/1989 |
| CN | 101194505 | 6/2008 |

(Continued)

OTHER PUBLICATIONS

"A New Approach to Addressability," CableData product brochure, Cable Data, Sacramento, California, undated.

(Continued)

*Primary Examiner* — Jason Salce
(74) *Attorney, Agent, or Firm* — Ropes & Gray LLP

(57) ABSTRACT

Systems and methods for providing custom video mosaic pages are provided. The custom pages may be locally-generated, remotely-generated, or partially locally-generated and partially remotely-generated. The custom pages may include local content, such as content recorded to a digital video recorder (DVR), overlaid on a multi-video composite feed. A local compositing system may render the mosaic pages and dynamically customize the pages based on user profile data, user preferences, and active user monitoring.

32 Claims, 11 Drawing Sheets

```
812              810
   ┌─────────────────────────────────────────┐
   │   VRN_WHATSHOT_PAGE_2674502 (Local)     │
   ├─────────────────────────────────────────┤
   │ <?xml version = "1.0" encoding = "ISO-8859-1"?>
   │ <cell_definitions>                       │ ─ 814
   │    <cell_1>                              │
   │       <c_name> "Sex and the City" </c_name>
   │       <c_source> DVR1 </c_source>        │
   │       <c_path> /local/dvr1/00004.mp2 </c_path>
   │       <c_loop> 00:02:45,00:03:11; 00:24:14,00:25:39 </c_loop>
   │       <onHighlight> MoreInfoDisp(0EA69FF) </onHighlight>
   │       <onSelect> dispMain(0EA69FF) </onSelect>
   │    </cell_1>
   │         .
   │         .
   │         .
```

U.S. PATENT DOCUMENTS

| | | |
|---|---|---|
| 4,246,495 A | 1/1981 | Pressman |
| 4,247,743 A | 1/1981 | Hinton et al. |
| 4,288,809 A | 9/1981 | Yabe |
| 4,305,101 A | 12/1981 | Yarbrough et al. |
| 4,321,593 A | 3/1982 | Ho et al. |
| 4,348,696 A | 9/1982 | Beier |
| 4,355,415 A | 10/1982 | George et al. |
| 4,390,901 A | 6/1983 | Keiser et al. |
| 4,425,579 A | 1/1984 | Merrell |
| 4,429,385 A | 1/1984 | Cichelli et al. |
| 4,482,789 A | 11/1984 | McVey |
| 4,484,217 A | 11/1984 | Block et al. |
| 4,484,220 A | 11/1984 | Beetner |
| 4,488,179 A | 12/1984 | Kruger et al. |
| 4,488,764 A | 12/1984 | Pfenning et al. |
| 4,495,654 A | 1/1985 | Deiss |
| 4,510,623 A | 4/1985 | Bonneau et al. |
| 4,528,589 A | 7/1985 | Block et al. |
| 4,536,791 A | 8/1985 | Campbell et al. |
| 4,566,033 A | 1/1986 | Reidenouer |
| 4,573,072 A | 2/1986 | Freeman |
| 4,588,901 A | 5/1986 | Maclay et al. |
| 4,598,288 A | 7/1986 | Yarbrough et al. |
| 4,604,708 A | 8/1986 | Lewis |
| 4,605,964 A | 8/1986 | Chard |
| 4,605,973 A | 8/1986 | Von Kohorn |
| 4,620,229 A | 10/1986 | Amano et al. |
| 4,636,595 A | 1/1987 | Smock et al. |
| 4,647,735 A | 3/1987 | Sicher |
| 4,648,667 A | 3/1987 | Baumgart |
| 4,685,131 A | 8/1987 | Horne |
| 4,694,490 A | 9/1987 | Harvey et al. |
| 4,706,121 A | 11/1987 | Young |
| 4,718,107 A | 1/1988 | Hayes |
| 4,739,510 A | 4/1988 | Jeffers et al. |
| 4,750,213 A | 6/1988 | Novak |
| 4,768,229 A | 8/1988 | Benjamin et al. |
| 4,807,023 A | 2/1989 | Bestler et al. |
| 4,809,393 A | 3/1989 | Goodrich et al. |
| 4,823,385 A | 4/1989 | Hegendorfer |
| 4,855,611 A | 8/1989 | Isobe et al. |
| 4,862,268 A | 8/1989 | Campbell et al. |
| 4,885,775 A | 12/1989 | Lucas |
| 4,888,796 A | 12/1989 | Olivo, Jr. |
| 4,890,320 A | 12/1989 | Monslow et al. |
| 4,890,321 A | 12/1989 | Seth-Smith et al. |
| 4,903,031 A | 2/1990 | Yamada |
| 4,930,158 A | 5/1990 | Vogel |
| 4,930,160 A | 5/1990 | Vogel |
| 4,965,825 A | 10/1990 | Harvey et al. |
| 4,977,455 A | 12/1990 | Young |
| 4,994,908 A | 2/1991 | Kuban et al. |
| 4,995,078 A | 2/1991 | Monslow et al. |
| 5,001,554 A | 3/1991 | Johnson et al. |
| 5,021,916 A | 6/1991 | Hubbard |
| 5,033,085 A | 7/1991 | Rew |
| 5,036,537 A | 7/1991 | Jeffers et al. |
| 5,038,211 A | 8/1991 | Hallenbeck |
| 5,045,947 A | 9/1991 | Beery |
| 5,046,125 A | 9/1991 | Takizawa |
| 5,051,837 A | 9/1991 | McJunkin |
| 5,053,797 A | 10/1991 | Samuels et al. |
| 5,053,884 A | 10/1991 | Kamijyo |
| 5,056,139 A | 10/1991 | Littlefield |
| 5,068,734 A | 11/1991 | Beery |
| 5,075,771 A | 12/1991 | Hashimoto |
| 5,119,507 A | 6/1992 | Mankovitz |
| 5,168,353 A | 12/1992 | Walker et al. |
| 5,172,111 A | 12/1992 | Olivo, Jr. |
| 5,206,722 A | 4/1993 | Kwan |
| 5,210,611 A | 5/1993 | Yee et al. |
| 5,223,924 A | 6/1993 | Strubbe |
| 5,231,310 A | 7/1993 | Oh |
| 5,235,415 A | 8/1993 | Bonicel et al. |
| 5,247,364 A | 9/1993 | Banker et al. |
| 5,253,066 A | 10/1993 | Vogel |
| 5,253,067 A | 10/1993 | Chaney et al. |
| 5,260,778 A | 11/1993 | Kauffman et al. |
| 5,303,063 A | 4/1994 | Kim et al. |
| 5,317,391 A | 5/1994 | Banker et al. |
| 5,357,276 A | 10/1994 | Banker et al. |
| 5,371,795 A | 12/1994 | Vogel |
| 5,384,910 A | 1/1995 | Torres |
| 5,396,546 A | 3/1995 | Remillard |
| 5,425,101 A | 6/1995 | Woo et al. |
| 5,446,488 A | 8/1995 | Vogel |
| 5,465,113 A | 11/1995 | Gilboy |
| 5,477,262 A | 12/1995 | Banker et al. |
| 5,485,221 A | 1/1996 | Banker et al. |
| 5,485,518 A | 1/1996 | Hunter et al. |
| 5,519,780 A | 5/1996 | Woo et al. |
| 5,544,354 A | 8/1996 | May et al. |
| 5,548,345 A | 8/1996 | Brian et al. |
| 5,550,575 A | 8/1996 | West et al. |
| 5,557,724 A | 9/1996 | Sampat et al. |
| 5,559,548 A | 9/1996 | Davis et al. |
| 5,579,055 A | 11/1996 | Hamilton et al. |
| 5,583,560 A | 12/1996 | Florin et al. |
| 5,583,576 A | 12/1996 | Perlman et al. |
| 5,585,838 A | 12/1996 | Lawler et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,619,274 A | 4/1997 | Roop et al. |
| 5,621,456 A | 4/1997 | Florin et al. |
| 5,629,733 A | 5/1997 | Youman et al. |
| 5,664,046 A | 9/1997 | Abecassis |
| 5,666,645 A | 9/1997 | Thomas et al. |
| 5,699,104 A | 12/1997 | Yoshinobu |
| 5,699,107 A | 12/1997 | Lawler et al. |
| 5,716,273 A | 2/1998 | Yuen |
| 5,751,335 A | 5/1998 | Shintani |
| 5,781,246 A | 7/1998 | Alten et al. |
| 5,805,763 A | 9/1998 | Lawler et al. |
| 5,815,145 A | 9/1998 | Matthews, III |
| 5,822,014 A | 10/1998 | Steyer et al. |
| 5,880,768 A | 3/1999 | Lemmons et al. |
| 5,900,868 A | 5/1999 | Duhault et al. |
| 5,903,314 A | 5/1999 | Niijima et al. |
| 5,907,323 A | 5/1999 | Lawler et al. |
| 5,917,492 A | 6/1999 | Bereiter et al. |
| 5,973,683 A | 10/1999 | Cragun et al. |
| 5,978,649 A | 11/1999 | Kahn |
| 5,990,862 A | 11/1999 | Lewis |
| 6,020,930 A | 2/2000 | Legrand |
| 6,025,837 A | 2/2000 | Matthews, III et al. |
| 6,061,097 A | 5/2000 | Satterfield |
| 6,072,460 A | 6/2000 | Marshall et al. |
| 6,108,365 A | 8/2000 | Rubin et al. |
| 6,177,931 B1 | 1/2001 | Alexander et al. |
| 6,240,555 B1 | 5/2001 | Shoff et al. |
| 6,275,268 B1 | 8/2001 | Ellis et al. |
| 6,295,646 B1 | 9/2001 | Goldschmidt Iki et al. |
| 6,331,877 B1 | 12/2001 | Bennington et al. |
| 6,373,528 B1 | 4/2002 | Bennington et al. |
| 6,405,371 B1 | 6/2002 | Oosterhout et al. |
| 6,434,621 B1 | 8/2002 | Pezzillo et al. |
| 6,456,334 B1 | 9/2002 | Duhault |
| 6,519,011 B1 | 2/2003 | Shendar |
| 6,563,515 B1 | 5/2003 | Reynolds et al. |
| 6,564,378 B1 | 5/2003 | Satterfield et al. |
| 6,661,468 B2 | 12/2003 | Alten et al. |
| 6,671,424 B1 | 12/2003 | Skoll et al. |
| 6,732,371 B1 | 5/2004 | Lee et al. |
| 6,751,401 B1 | 6/2004 | Arai et al. |
| 6,757,906 B1 | 6/2004 | Look et al. |
| 6,766,526 B1 | 7/2004 | Ellis |
| 6,772,435 B1 | 8/2004 | Thexton et al. |
| 6,785,904 B1 | 8/2004 | Franken et al. |
| 6,804,824 B1 | 10/2004 | Potrebic et al. |
| 6,865,746 B1 | 3/2005 | Herrington et al. |
| 6,898,762 B2 | 5/2005 | Ellis et al. |
| 6,938,208 B2 | 8/2005 | Reichardt |
| 6,948,183 B1 | 9/2005 | Peterka |
| 7,174,512 B2 | 2/2007 | Martin et al. |
| 7,296,295 B2 | 11/2007 | Kellerman et al. |

| | | | |
|---|---|---|---|
| 2001/0031656 A1 | 10/2001 | Marshall et al. | |
| 2002/0010932 A1 | 1/2002 | Nguyen et al. | |
| 2002/0026638 A1 | 2/2002 | Eldering et al. | |
| 2002/0059593 A1 | 5/2002 | Shao et al. | |
| 2002/0078449 A1 | 6/2002 | Gordon et al. | |
| 2002/0157099 A1 | 10/2002 | Schrader et al. | |
| 2002/0166122 A1* | 11/2002 | Kikinis et al. | 725/56 |
| 2003/0014752 A1 | 1/2003 | Zaslavsky et al. | |
| 2003/0110499 A1 | 6/2003 | Knudson et al. | |
| 2003/0115601 A1* | 6/2003 | Palazzo et al. | 725/42 |
| 2003/0117428 A1* | 6/2003 | Li et al. | 345/716 |
| 2003/0159149 A1 | 8/2003 | Satterfield | |
| 2003/0204848 A1 | 10/2003 | Cheng et al. | |
| 2003/0217360 A1 | 11/2003 | Gordon et al. | |
| 2004/0070593 A1 | 4/2004 | Neely et al. | |
| 2004/0117831 A1 | 6/2004 | Ellis et al. | |
| 2004/0210935 A1 | 10/2004 | Schein et al. | |
| 2005/0050070 A1 | 3/2005 | Sheldon | |
| 2005/0165918 A1 | 7/2005 | Wantanabe et al. | |
| 2005/0235323 A1 | 10/2005 | Ellis et al. | |
| 2005/0251843 A1 | 11/2005 | Walker | |
| 2005/0283791 A1 | 12/2005 | McCarthy et al. | |
| 2006/0236342 A1 | 10/2006 | Kunkel et al. | |
| 2007/0011702 A1 | 1/2007 | Vaysman | |
| 2007/0030391 A1 | 2/2007 | Kim et al. | |
| 2007/0055989 A1 | 3/2007 | Shanks et al. | |
| 2007/0154163 A1 | 7/2007 | Cordray | |
| 2007/0157237 A1 | 7/2007 | Cordray et al. | |
| 2007/0157249 A1 | 7/2007 | Cordray et al. | |
| 2007/0199015 A1 | 8/2007 | Lopez et al. | |
| 2007/0220551 A1 | 9/2007 | Shanks et al. | |
| 2007/0250865 A1 | 10/2007 | Krakirian | |
| 2007/0294734 A1 | 12/2007 | Arsenault et al. | |
| 2008/0033992 A1 | 2/2008 | Sloo et al. | |
| 2008/0066103 A1 | 3/2008 | Ellis et al. | |
| 2008/0092157 A1 | 4/2008 | Walter et al. | |
| 2008/0147650 A1 | 6/2008 | Marsh | |
| 2008/0163059 A1 | 7/2008 | Craner | |
| 2008/0189740 A1 | 8/2008 | Carpenter et al. | |
| 2008/0276283 A1 | 11/2008 | Boyer et al. | |

FOREIGN PATENT DOCUMENTS

| | | |
|---|---|---|
| FR | 2678091 | 12/1992 |
| GB | 2209417 | 5/1989 |
| GB | 2210526 | 6/1989 |
| GB | 2215928 | 9/1989 |
| JP | 2008535411 | 8/2008 |
| WO | WO-8601962 A1 | 3/1986 |
| WO | WO-8912370 A1 | 12/1989 |
| WO | WO-9015507 A1 | 12/1990 |
| WO | WO-9311638 A1 | 6/1993 |
| WO | WO-9311639 A1 | 6/1993 |
| WO | WO-9311640 A1 | 6/1993 |
| WO | WO-9637996 A1 | 11/1996 |
| WO | WO-9826584 A1 | 6/1998 |
| WO | WO-9856176 A1 | 12/1998 |
| WO | WO-9903271 A1 | 1/1999 |
| WO | WO-9904561 A1 | 1/1999 |
| WO | WO-9956466 A1 | 11/1999 |
| WO | WO-0005887 A1 | 2/2000 |
| WO | WO-0008855 A1 | 2/2000 |
| WO | WO-0018114 A1 | 3/2000 |
| WO | WO-0033560 A2 | 6/2000 |
| WO | WO-0033565 A2 | 6/2000 |
| WO | WO-0245304 A2 | 6/2002 |
| WO | WO-02054765 A1 | 7/2002 |
| WO | WO-02087219 A2 | 10/2002 |
| WO | WO-03026275 A2 | 3/2003 |
| WO | WO-2004047440 A2 | 6/2004 |
| WO | WO-2006081577 A2 | 8/2006 |
| WO | WO-2006105480 A1 | 10/2006 |
| WO | WO-2008024420 A2 | 2/2008 |
| WO | WO-2008082461 A1 | 7/2008 |

OTHER PUBLICATIONS

"Focus Highlight for World Wide Web Frames", IBM Technical Disclosure Bulletin, Nov. 1997, pp. 89-90.

"Weststar and Videotoken Network Present the CableComputer" (Plaintiff's Exhibit 334).

Addressable Converters: A New Development of Cable Data, Via Cable, vol. 1, No. 12, Dec. 1981, Cable Data, Sacramento, California.

Brugliera, Vito, "Digital On-Screen Display—A New Technology for the Consumer Interface," Symposium Record Cable Sessions of the 18th International Television Symposium & Technical Exhibition, Jun. 1993, pp. 571-586.

CableComputer User's Guide, bearing a date of Dec. 1985 (Plaintiff's Exhibit 289).

CableData, Roseville Consumer Presentation, Mar. 1986.

Committee on Commerce, "Communications Act of 1995," XP-002100790 Jul. 1995, pp. 1-4.

Daniel F. Walsh Jr., Timing Considerations in RF Two Way Data Collection and Polling, Jerrold—Applies Media Lab, 1989 NCTA Technical Papers, pp. 47-56, 1989.

Daniel H. Smart, innovative Aspects of a Switched Star Cabled Television Distribution System, British Cable Services Limited, 1987 NCTA Technical Papers, pp. 26-35, 1987.

Family Safe Media, Compare Profanity Filters, available at http://www.familysafemedia.com/compare_filters.html (printed Mar. 14, 2007).

Family Safe Media, TV Guardian Summary, available at http://www.familysafemedia.com/tv_guardian/ tv_guardian_summary-html (printed Mar. 14, 2007).

Federal Communications Commission, In the Telecommunications Act of 1996, Public Law 104-104, effective Feb. 8, 1996, in Section 551, "Parental Choice in Television Programming," XP-002100791.

Gary Libman, Times Staff Writer Chaining the Channels, A New Generation of Television Blocking Systems Allows More Options for Parent, Seeking to Control Kids' Viewing, Los Angeles Times, Aug. 9, 1993.

Gregory F. Vaeth, John Feras, Enertec, Inc, The Addressable Controller of the Future, *General Instruments/Jerrold Communication*, 1990 NCTA Technical Papers, pp. 274-279, 1990.

Jerrold Communications Publication, "Cable Television Equipment," dated 1992 and 1993, pp. 8-2.1 to 8-6 and 8-14.1 to 8-14.3.

M/A-COM, Inc., "Videocipher II Satellite Descrambler Owners Manual," dated prior to Feb. 1986.

Michael Dufresne, "New Services: An Integrated Cable Network's Approach, Videotron Communication LTEE," Technical Papers of NCTA 31st Annual Convention & Exposition, pp. 156-160 (1982).

Richard G. Merrell, Mack S. Daily, An Auto-Dialer Approach to Pay-Per-View Purchasing, Zenith Electronics Corporation, Glenview, Illinois, 1989 NCTA Technical Papers, pp. 34-38, 1989.

Roseville City Council Presentation, bearing a date of Mar. 13, 1985 (Defendant's Exhibit 26).

Singha, Edward Apurba, "An interactive solution for TV viewers," The Daily Star, Apr. 3, 2009, http//www.the dailystar.net/pf_story.php?nid=463, printed Apr. 2, 2009, 2 pps.

StarSight Telecast Inc. User's Guide, pp. 1-93 (1994).

T. Rzeszewski et al., "A Microcomputer Controlled Frequency Synthesizer for TV." Reprinted from IEEE Trans. Consum. Electron. vol. CE-24, pp. 145-153 (1978).

Tech Notes: Product Updates from M/A-COM Cable Home Group, "Videocipher Owner's Manual Update," Issue No. 6, Feb. 1986.

* cited by examiner

SYSTEMS AND METHODS FOR CREATING CUSTOM VIDEO MOSAIC PAGES WITH LOCAL CONTENT

CROSS-REFERENCE TO RELATED APPLICATION

This is a continuation of U.S. application Ser. No. 11/647,787 filed on Dec. 28, 2006, which is hereby incorporated by reference herein in its entirety.

BACKGROUND OF THE INVENTION

This invention relates generally to media systems and, more particularly, to media systems supporting custom video mosaic pages.

Video mosaic pages allow users to access services and video assets from video-rich menu screens in an interactive application, such as an interactive media guidance application. These video-rich menu screens may present a plurality of video assets (e.g., broadcast television channels or on-demand content) each in its own video window, or cell, on a single page.

Video mosaic pages are typically remotely-generated at a distribution facility or central facility. At the distribution facility or central facility, the video assets in the mosaic page are composited into a single video feed before being transmitted to the user equipment device. The multi-video feed may be transmitted as a composite stream (e.g., MPEG-2 stream) to a number of user equipment devices. For example, the composite stream may be transmitted to user equipment devices over a digital television channel. After the stream is received by the user equipment devices, a local video mosaic client may overlay graphics, icons, and text onto the display to create custom video mosaic pages. For example, one implementation of a video mosaic system for providing video mosaic pages called "Video-Rich Navigation" (VRN) is described in U.S. patent application Ser. No. 11/395,380, filed Mar. 30, 2006, which is hereby incorporated by reference herein in its entirety.

Although video mosaic pages provide a more user-friendly way to present video assets to viewers, the pages may be limited in several respects. For example, because video mosaic pages are typically remotely-generated, there is very little flexibility for users to personalize the look and feel of the page. The remotely-generated nature of these pages also prevents dynamic page creation and customization, for example, at the viewer's user equipment.

In addition, typical video mosaic pages are limited in the type of content that is available for display in the pages. Because the pages are typically remotely-generated, local content, such as content stored on a digital video recorder (DVR), gaming device, or other suitable local storage device, are generally not available for use in video mosaic pages.

Accordingly, it would be desirable to provide systems and methods for dynamic video mosaic page creation and display. The video mosaic pages may combine local content with broadcast, multicast, switched digital video, and on-demand assets in a single interactive display. It would also be desirable to provide video mosaic pages capable of being automatically customized based on user behavior and user preferences.

SUMMARY OF THE INVENTION

In accordance with the principles of the present invention, a VRN client is implemented on a user equipment device. The VRN client supports the generation of video mosaic pages from various video asset sources. These asset sources may include linear content sources (e.g., broadcast television sources), non-linear content sources (e.g., on-demand and Internet sources), and local sources (e.g., recorded content, local gaming content, and content stored in memory).

The VRN client may create or present locally-generated and remotely-generated video mosaic pages or a combination of locally and remotely-generated video mosaics. The video sources in remotely-generated pages may be composited remote from the user equipment device into a single video feed. In this type of arrangement, screen data may be transmitted to the user equipment device, either in-band or out-of-band, that identifies the video sources in the mosaic page as well as any other information necessary to successfully display the page. Suitable information necessary to successfully display the page may include, for example, action data that defines the behavior and response to a viewer selection of a cell (or group of cells) in the mosaic page, graphics, on-screen text, advertisements, and any other elements that are to be displayed with or on the mosaic page.

The screen data may also include one or more placeholder cell definitions. The placeholder cell definitions may include information relating to one or more cells of the video mosaic page that do not correspond to video in the transmitted composite multi-video feed. Thus, the remotely-generated multi-video feeds in accordance with the invention may have one or more "blank" areas corresponding to placeholder cell locations. The video assets presented in the placeholder cells may be identified and selected dynamically at the user equipment by the VRN client. These video assets may include local content. For example, recorded content, local gaming content, and videophone messages may be presented in the placeholder cells. The selection of video assets for presentation in the placeholder cells may be based on active user monitoring, direct interaction from a user, user preferences, or any other suitable user-derived or user-generated data.

For example, placeholder cell definitions in the received screen data may include local function calls that are executed automatically as the screen data is received by the user equipment device. The local function calls may return suitable identifying information about local assets to be displayed in one or more placeholder cells of the mosaic page. This identifying information may include, for example, local file system paths for text, advertisements, and video assets to be presented in the placeholder cells or elsewhere on the mosaic page.

After receiving the screen data, the VRN client may determine the size and location of any placeholder cells (e.g., x and y coordinates) in the video mosaic page. The VRN client may then overlay suitable content, including local content, at the appropriate positions corresponding to the placeholder cells. In this way, VRN pages with one or more video assets selected at the user equipment device may be presented to the user.

Mosaic pages in accordance with the present invention may also be completely locally-generated, if desired. The video sources included in the locally-generated pages may be composited at the user equipment device that the page is to be displayed on. Local assets may populate some or all of the cells of the locally-generated mosaic page. The remaining cells may be populated with on-demand content, broadcast television content, or any other video content accessible by the user equipment.

In order to overlay a local video asset on a video mosaic page or create locally-generated pages, in some embodiments, a local MPEG (or other suitable video standard) compositing system may extract selected portions of local content for use in the video mosaic page. The extracted portion or portions may be saved to the user equipment device as a continuous or looping video file. The portions selected for extraction may be determined, for example, by a scene selection algorithm that identifies scene changes within a video asset. In some embodiments, the scene selection algorithm may also analyze user viewing behavior or user preferences to determine which portions of the local content to extract for use in the video mosaic page. For example, if a certain portion of a local video asset (e.g., the user's favorite scene) is watched more frequently then other portions, this portion may be selected by the scene selection algorithm for extraction.

In some embodiments, appropriate content for looping may be identified in advance by the content provider and communicated to the user equipment device by a sideband signal or markings within the video, or the location of looping content within an asset may be known in advance by a standard established for locating looping content by the system operator (e.g., looping content may always be placed in the last minute of a program).

In some embodiments, the VRN client is configured to generate and display various custom video mosaic pages. These custom pages may be populated, for example, with the user's most frequently watched broadcast programs, on-demand content, and recorded content. In some embodiments, videophone messages received for the user may also populate one or more cells of the custom mosaic pages.

In some embodiments, video mosaic pages may be dynamically customized on-the-fly based on such factors as, for example, active user monitoring, user behavior, and user preference information. The VRN client (or some other application) may monitor all user interaction with the user equipment device. The application may then log this user interaction information to the user equipment device and build a profile for each user accessing the user equipment device. From the profile data, the VRN client may select particular video assets, such as assets the user has recently watched, accessed, or recorded, assets that the user has bookmarked (e.g., VOD assets), assets that the user might like (based on, e.g., frequently accessed genre categories), video messages that have been received but not yet displayed, or any other suitable video assets, for display in a custom video mosaic page.

In multi-room DVR systems, a local VRN page may display portions of content that are stored on a user equipment device other than the local user equipment device. Selection of such content may be made on a user basis. For example, a user may have logged into different devices (e.g., a set-top in the living room and one in the bedroom) and started watching different content in each context. Upon accessing (e.g., logging in) to either device, a custom "In progress for this user" VRN page may pull content from both devices and composite the content into a locally-generated VRN page that is displayed upon the local device.

In some embodiments, compositing is done remote from the user equipment device that ultimately displays the VRN content, but the composited result includes content sourced from the local user equipment device. For example, consider a user that is local to a mid-range user equipment device that supports DVR, remote streaming, but not local compositing. However, within the home or within the network, there exists another high-end user equipment device that supports DVR, remote streaming, and local compositing, or there exists a compositing-only engine on the network. As such, some embodiments may involve providing at least part of the content to be composited into a VRN page from the device that ultimately displays the composited VRN result.

BRIEF DESCRIPTION OF THE DRAWINGS

The above and other features of the present invention, its nature and various advantages will be more apparent upon consideration of the following detailed description, taken in conjunction with the accompanying drawings, in which.

DETAILED DESCRIPTION OF THE INVENTION

The systems and methods described herein are directed toward providing custom video mosaic pages. Although the term "video-rich navigation" or "VRN" is sometimes used herein when referring to the mosaic pages, system elements (e.g., the VRN client), and the mosaic environment, the present invention is compatible with any video mosaic environment. The VRN environment is just one example of a suitable implementation of a video mosaic environment, which is described in more detail in U.S. patent application Ser. No. 11/395,380.

As described in more detail below, these custom mosaic pages may display various types of video assets, including locally-recorded assets, in one or more video windows, or cells, of the mosaic page. In addition to full-motion video and associated audio, these cells may also include still images, text, icons, logos, advertising, or any combination of these (or any other suitable) elements. The particular video assets included in the cells of the custom mosaic pages may be selected based on a number of criteria, such as active user monitoring and user preferences. In this way, the video mosaic pages of the present invention may provide a more personalized look and feel with significant relevance to the user.

Figure 1:
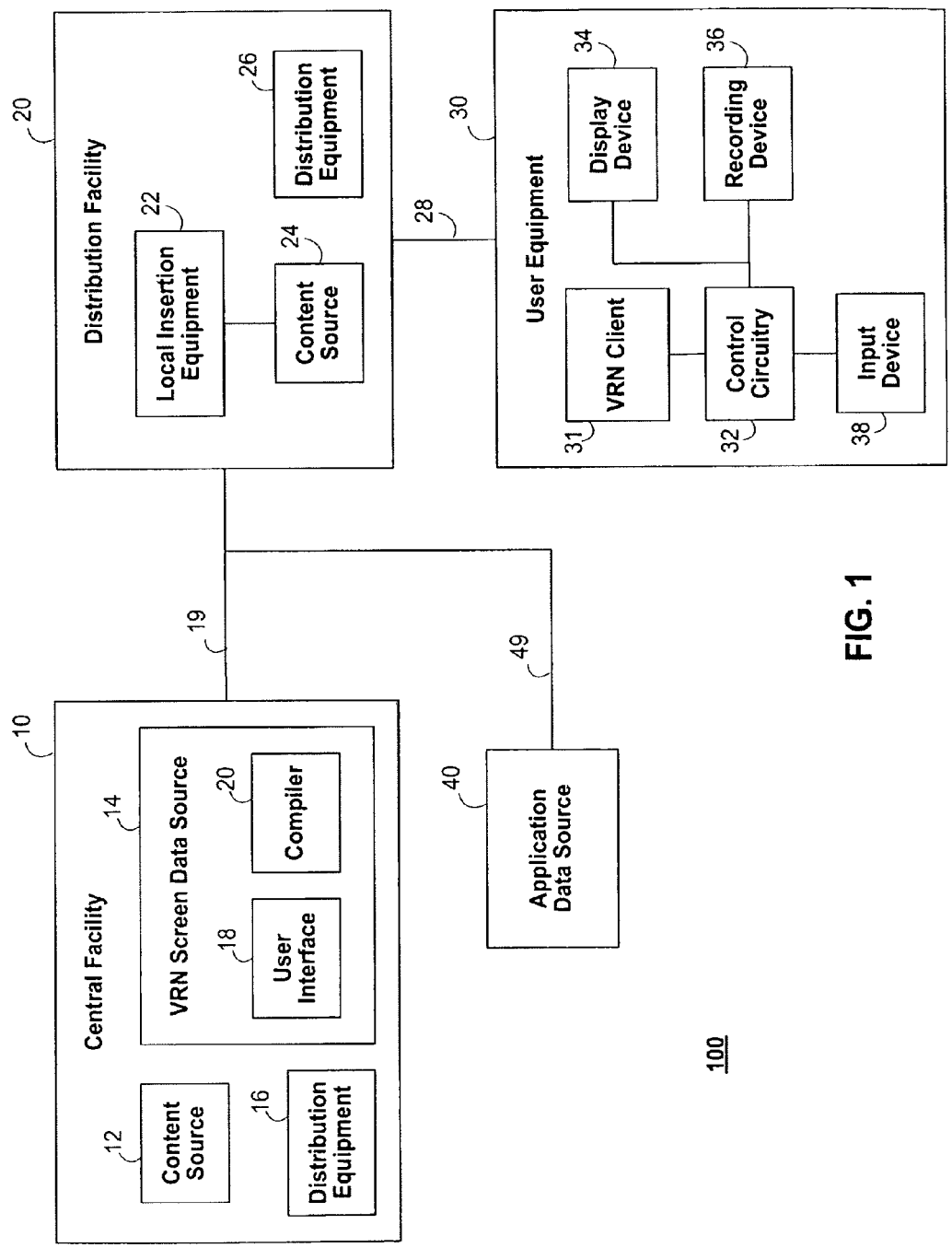
FIG. 1 is a simplified diagram of an illustrative interactive video mosaic media system architecture in accordance with one embodiment of the invention.

FIG. 1 shows illustrative media system 100 for providing custom video mosaic pages. Central facility 10 may include content source 12, VRN screen data source 14, and distribution equipment 16. Content source 12 may include any equipment suitable for producing or generating VRN pages or screens including MPEG-4 based compositing technologies and may receive content over any suitable network (e.g., a Gigabit Ethernet network). The video content from content source 12 may be in analog or digital form. In other embodiments, content source 12 may be in a facility other than central facility 10, and may also provide content for distribution of regular television channels (e.g., broadcast programming and VOD content).

VRN screen data source 14 may be any equipment suitable for generating VRN screen data. For example, VRN screen data source 14 may be a personal-computer (PC) based system or a workstation. User interface 18 may be any suitable interface, such as a Windows-based or Unix-based graphic user interface (GUI), which allows, for example, an operator to define VRN definitional files and synchronize the VRN screen data of the definitional files with content from content source 12. The user interface may allow an operator to, for example, specify transitions between distinct configuration specifications for selectable items in synchronization with video content. The user interface may also allow an operator to define control data which controls, inter alia, the appearance, functionality, and interactivity of the screen elements, as well as the content or asset displayed in a screen element.

The screen data may also include local functions calls to be executed on user equipment 30 (by either VRN client 31 or control circuitry 32). The local function calls may be inserted into the screen data by central facility 10 or distribution facility 20. The local function calls may return suitable data values, such as the local path to recording device 36 or other local storage within user equipment 30, an identification of local content to be included in a music page, or any other suitable information. In some embodiments, the local functions are part of an application program interface (API) used to interface with VRN client 31. VRN client 31 may automatically execute any local function calls embedded in the screen data immediately after receiving the screen data, or the instructions and function calls may be executed at some later time (e.g., when a user attempts to access or display the mosaic page). FIG. 8, described below, shows illustrative mark-up language tags used to transmit local function calls within the screen data in some embodiments.

Compiler 20, which may include any suitable combination of hardware and software, may compile or translate the VRN screen data of the definitional files into another format, such as binary, XML, or HTML format. In some embodiments, input from user interface 18 may be used to directly generate the screen data without need for compiler 20.

Distribution equipment 16 may be any suitable equipment for distributing VRN pages from content source 12 and VRN screen data from VRN screen data source 14 over communications path 19 to distribution facility 20, and further over communication path 28 for distribution to user equipment 30. Central facility 10 may distribute the VRN pages and screen data to multiple distribution facilities 20, but only one has been shown to avoid over-complicating the drawing. In other embodiments, central facility 10 may distribute the VRN pages and screen data to users at user equipment 30 directly. Distribution equipment 16 may distribute the VRN screens and VRN screen data in any suitable analog or digital format and over any suitable communications path (e.g., satellite or terrestrial broadcast or the Internet). VRN screen data may be distributed in-band or out-of-band with respect to the VRN pages. The screen data may also be sent synchronously with the VRN pages or asynchronously. For example, screen data, VRN pages, or both, may be sent at times of reduced network utilization.

Distribution facility 20 may be any facility (e.g., a cable headend) suitable for receiving the VRN screens and screen data and distributing the screens and screen data to user equipment 30. There may be multiple users at multiple instances of user equipment 30, but only one instance of user equipment has been shown to avoid over-complicating the drawing. Distribution facility 20 may include local insertion equipment 22 and content source 24 for allowing a local operator to insert content and data into the VRN screens or VRN screen data, respectively, and compile VRN screen data into binary format for transmission (if required). Local insertion equipment 22 may run, for example, a local version of user interface 18 and compiler 20.

Distribution equipment 26 may distribute the VRN pages and VRN screen data in any suitable analog or digital format and over any suitable communications path to user equipment 30 (e.g., broadcast, cable, or the Internet.). The communication paths 19, 49, and 28 may include, for example, a satellite path, a fiber-optic path, a cable path, an Internet path, or any other suitable wired or wireless path. For example, VRN pages may be provided as MPEG-2 or MPEG-4 feeds. Distribution equipment 26 may provide each VRN page (and the VRN screen data) as a tunable analog or digital channel, or as a VOD stream (both of which are referred to herein as VRN channels). The VRN channels provide the users of user equipment 30 with a set of interactive features that make up a VRN application.

In some embodiments, distribution facility 20 may provide the VRN channel full-time over a given analog or digital channel. Alternatively, distribution facility 20 may provide VRN channels on-demand or during specific time intervals or using switched digital video technology.

Distribution facility 20 may provide one or more VRN applications to user equipment 30. A VRN application may include one or more VRN pages, buttons, and associated functionality. For example, FIG. 4, described in more detail below, shows a homepage display screen associated with an illustrative VRN "what's hot" application.

User equipment 30 may include any equipment suitable for providing an interactive media experience and for implementing the VRN applications provided by distribution facility 20. User equipment 30 may include television equipment such as a television, set-top box, recording device, video player, user input device (e.g., remote control, keyboard, mouse, touch pad, touch screen, or voice recognition interface), or any other device suitable for providing an interactive multimedia experience. For example, user equipment 30 may include a DCT 2000, 2500, 5100, 6208 or 6412 set-top box provided by Motorola, Inc. In some embodiments, user equipment 30 may include computer equipment, such as a personal computer with a television card (PCTV). In some embodiments, user equipment 30 may include a gaming system, a portable electronic device, such as a portable DVD player, a portable gaming device, a cellular telephone, a video phone, a PDA, a music player (e.g., MP3 player), or any other suitable portable or fixed device.

In the example of FIG. 1, user equipment 30 includes control circuitry 32, display device 34, recording device 36, user input device 38, and VRN client 31, all of which may be implemented as separate devices or as a single device. VRN client 31 may be implemented on user equipment 30 to receive, execute, and support VRN applications.

Control circuitry 32 is adapted to receive user input from input device 38 and execute the instructions of VRN client 31 and any other interactive applications running on user equipment 30. Control circuitry 32 may include one or more tuners (e.g., analog or digital tuners), decoders (e.g., MPEG decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 30, and any other suitable component for providing analog or digital media programming and interactive media features. In one embodiment, control circuitry 32 may be included as part of one of the devices of user equipment 30 such as, for example, part of recording device 36, display device 34, or any other suitable device (e.g., a set-top box, television, or video player).

Display device 34 may include any suitable device such as, for example, a television monitor, an LCD screen, a computer monitor, or a display incorporated in user equipment 30 (e.g., a cellular telephone display or music player display). Display device 34 may also be configured to provide for the output of audio and/or other sensory output (e.g., a holographic projector or virtual reality simulator).

Recording device 36 may be a personal video recorder (PVR), digital video recorder (DVR), video cassette recorder (VCR), DVD-recorder, gaming device, digital audio library, or any other suitable recording device. Recording device 36 may include one or more tuners. In addition to storing programming assets, recording device 36 may also store video messages received by an attached or integrated video phone.

VRN client 31 may be implemented on user equipment 30 as a stand alone application or part of another interactive application, such as an interactive media guidance application (IMGA) or interactive program guide (IPG). One or more of the interactive applications may receive interactive application data from application data source 40. As shown in FIG. 1, the data may be received via distribution facility 20 over communication path 49. Alternatively, the data may be received by user equipment 30 from application data source 40 over a direct communication path (not shown). Application data source 40 may also be part of central facility 10 or distribution facility 20. In some embodiments, the interactive application data may include elements that are referenced in the VRN screen data for inclusion in the VRN application such as graphics, text, logos, advertising, and the like. VRN templates, for example, may be provided as part of interactive television application data.

Homepages (and other VRN screens or pages) delivered to user equipment 30 may include a number of interactive elements. Interactive elements may be highlighted, selected, or both. If the user navigates to a specific interactive element (e.g., by using the arrow keys on a remote control device), the interactive element may be visually highlighted in some fashion (e.g., a colored border may appear around the element). If the user selects a highlighted interactive element (e.g., by pressing the "OK" button on a remote control device), the system may display a specific tunable channel, VOD asset, VOD screen, recorded asset (e.g., a video message or some other programming recorded or stored on recording device 36), or another interactive application screen, based on selection behavior specified for the interactive element in the VRN screen data.

Although, in the illustrated embodiment of FIG. 1, VRN client 31 is internal to user equipment 30, VRN client 31 may be implemented externally or partially implemented externally to user equipment 30. For example, VRN client 31 may be implemented at central facility 10 or distribution facility 20 and may run using a client-server or distributed architecture where some of the application is implemented locally on user equipment 30 in the form of a client process and some of the application is implemented at a remote location in the form of a server process. VRN client 31 may also be implemented completely on any suitable server, computer equipment, or set-top box accessible by user equipment 30.

Figure 2:
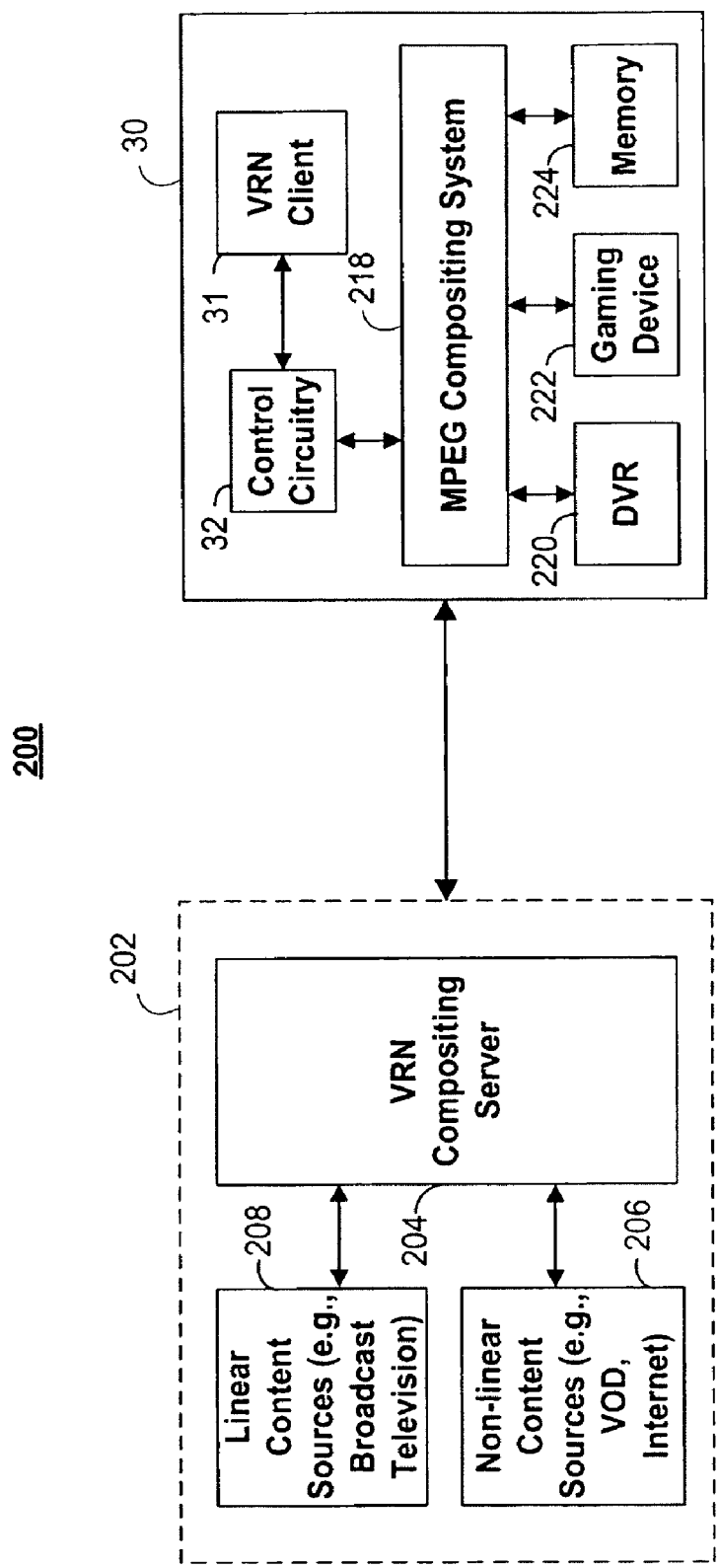
FIG. 2 is a simplified diagram of illustrative network and local content sources for use in video mosaic page composition in accordance with one embodiment of the invention.

FIG. 2 shows illustrative media system 200 with available content sources for use in the VRN pages of the present invention. Remote facility 202 may exist at a cable system headend or a remote MSO facility responsible for creating custom VRN pages and delivering these pages to user equipment 30. In some embodiments, remote facility 202 is the same facility as central facility 10 or distribution facility 20 (both of FIG. 1).

Remote facility 202 may include VRN compositing server 204. VRN compositing server 204 may combine one or more video assets from linear content sources 208 and non-linear content sources 206 into a single display or VRN page. After generating the appropriate screen data, the page may then be transmitted to user equipment 30. VRN compositing server 204 may include MPEG decoding, MPEG encoding, and MPEG transcoding circuitry. Additionally or alternatively, VRN compositing server 204 may communicate with remote devices that perform any of the aforementioned compositing, encoding, decoding, or transcoding functions.

Linear content sources 208 may include any content sources containing video assets transmitted or broadcast on a schedule. The video assets available from linear content sources 208 may include, for example, broadcast television programming, switched digital television, and pay-per-view programming. Non-linear content sources 206 may include any content sources containing video assets not transmitted or broadcast on a schedule. Example of non-linear content sources include Internet content and on-demand programming. VRN compositing server 204 may use content from one or both of linear content sources 208 and non-linear content sources 206 in compositing video assets to create a VRN page. For example, one cell in a VRN page may display a video from an Internet website, another cell in the same VRN page may display broadcast television content, while still another cell may display on-demand programming.

In addition to compositing video assets from linear content sources 208 and non-linear content sources 206, VRN compositing server 204 may also designate one or more cells in a VRN page as a placeholder cell. These placeholder cells may correspond to blank cells without a corresponding video asset presented in the cell location. Appropriate video may then be overlaid in the placeholder cell locations at user equipment 30. For example, user equipment 30 may include MPEG compositing system 218, which may include MPEG encoding, decoding, and transcoding circuitry. MPEG compositing system may extract video from DVR 220, gaming device 222, or memory 224 for use in populating placeholder VRN cells or locally-generated VRN pages. The extracted video may be a continuous or looping video segment from one or more video assets stored on these devices. If generating a locally-generated page, MPEG compositing system 218 may then create a composite feed with a plurality of video assets, including the video extracted from local assets, for use in a VRN page.

For example, DVR 220 may include hours of stored broadcast, on-demand, and pay-per-view programming. MPEG compositing system 218 may extract video segments from selected assets stored on DVR 220 and store these extracted segments back on DVR 220 or some other storage device (e.g., memory 224). These extracted segments of continuous or looping video may be overlaid on one or more cells of a VRN page, such as the pages shown in FIGS. 4-7, which are described in more detail below.

Similarly, MPEG compositing system 218 may also extract segments of video from gaming device 222 and from memory 224. Gaming device 222 may include a plurality of interactive games stored on CD-ROM, cartridge, DVD, or any other suitable storage mechanism. MPEG compositing system 218 may extract video from gaming device 222 and store the video on DVR 220 or in memory 224. Memory 224 may include any suitable memory or storage device, including hard drives, tape devices, optical drives, flash memory, RAM, ROM, and hybrid types of memory. The video extracted from gaming device 222 may also be overlaid on one or more cells of a VRN page, such as the pages shown in FIGS. 4-7.

In certain systems used to create VRN pages, multiple videos are resized and composited in a grid configuration and then the entire grid of video is recompressed to create one video stream (e.g., a video elementary stream in MPEG-2 parlance) which is carried in one video pipe (a digital channel or single service multiplex in MPEG-2 parlance) corresponding to approximately 3 Mbps of data bandwidth. Alternatively or additionally, headend systems may take multiple videos, create a single video stream for each of the multiple videos and then multiplex the multiple video streams into a single transport multiplex (e.g., a multiple service transport multiplex in MPEG-2 parlance, corresponding to, for example, one 6 MHz band in North American cable systems). In this configuration, each of the elementary stream videos requires approximately 3 Mbps of bandwidth, and a typical 10 video multiplex may occupy 30 Mbps. Also in this configuration, one or more of these roughly 3 Mbps multiplexed videos may be composited videos as described above. The latter multiplexing may be done not for the purposes of mosaic presentation, but rather as a means of packing multiple videos into a single band of frequency corresponding to a 64 or 256 QAM modulator. However, one embodiment of the present invention uses the multiplexing capability of MPEG-2 (or any multiplexing transport such as Internet protocol (IP) or ATM) to flexibly bundle the videos corresponding to the remotely supplied video elements of a VRN page but with the recognition that the bundled videos will be composited together in the user equipment device. Thus, the spatial resolution and size may be adjusted accordingly at the headend before multiplexing the videos. Each adjusted video will thus take less bandwidth to send than its corresponding full resolution source video (e.g., less than 80%), but by not compositing these adjusted videos in the headend, this approach allows flexibility in the user equipment device for compositing while also saving bandwidth. The multiplexed videos may then be demultiplexed and optionally decompressed at the user equipment device.

In some embodiments, additional local video assets may be available for display in one or more cells of a VRN page. For example, video messages stored in memory 224, DVR 220, or an attached or integrated videophone may populate cells of a VRN page. MPEG compositing system 218 may encode these video assets into a suitable MPEG (e.g., MPEG-2 or MPEG-4) format for presentation on a VRN page, if required.

In a typical usage scenario, a multi-video feed is composited (at least partially) by VRN compositing server 204 at remote facility 202. As described above, the composited feed may include a plurality of video assets, each positioned in a cell location. Certain cell locations, such as those corresponding to placeholder cells may have no associated video when the feed is composited. The video assets for these cells may be selected and overlaid by VRN client 31. After the user equipment device receives the VRN feed, VRN client 31 may process the transmission and prepare the page for display. In the process of preparing the page for display, VRN client 31 may analyze the cell definitions contained in the screen data (which may be transmitted with the VRN page or over a separate channel). VRN client 31 may then instruct control circuitry 214 to execute any local functions that may be referenced within the screen data. In executing the local functions, control circuitry 32 may access (or cause MPEG compositing system 218 to access) one or more video segments from DVR 220, gaming device 222, and/or memory 224. After all the video sources for the VRN page are located, VRN client 31 may display the VRN page with local assets overlaid on the page in one or more cell locations. In this way, the cells of the VRN page may be populated with assets from various sources, including local sources.

In lieu of receiving the VRN page from remote facility 202, VRN pages may also be entirely or partially locally-generated in accordance with the present invention. Locally-generated pages may be fully composited at user equipment 30 in some embodiments. To composite a page locally, MPEG compositing system 218 may create a composited multi-video interactive page. The video sources used in the composited multi-video interactive page may include any sources accessible by user equipment 30, including local content, content from linear sources 208, and content from non-linear sources 206. This provides a more flexible alternative to remotely-generated pages.

In some cases, the difference between compositing a VRN page locally and remotely may be significant. For example, a VRN page with few or no local assets may be more efficiently composited at remote facility 202, while pages with more local assets may benefit from local composition. In addition, at least partial local composition allows for dynamic VRN page creation and customization based on active user monitoring, user behavior, and user preferences, as described in more detail below.

Figure 3:
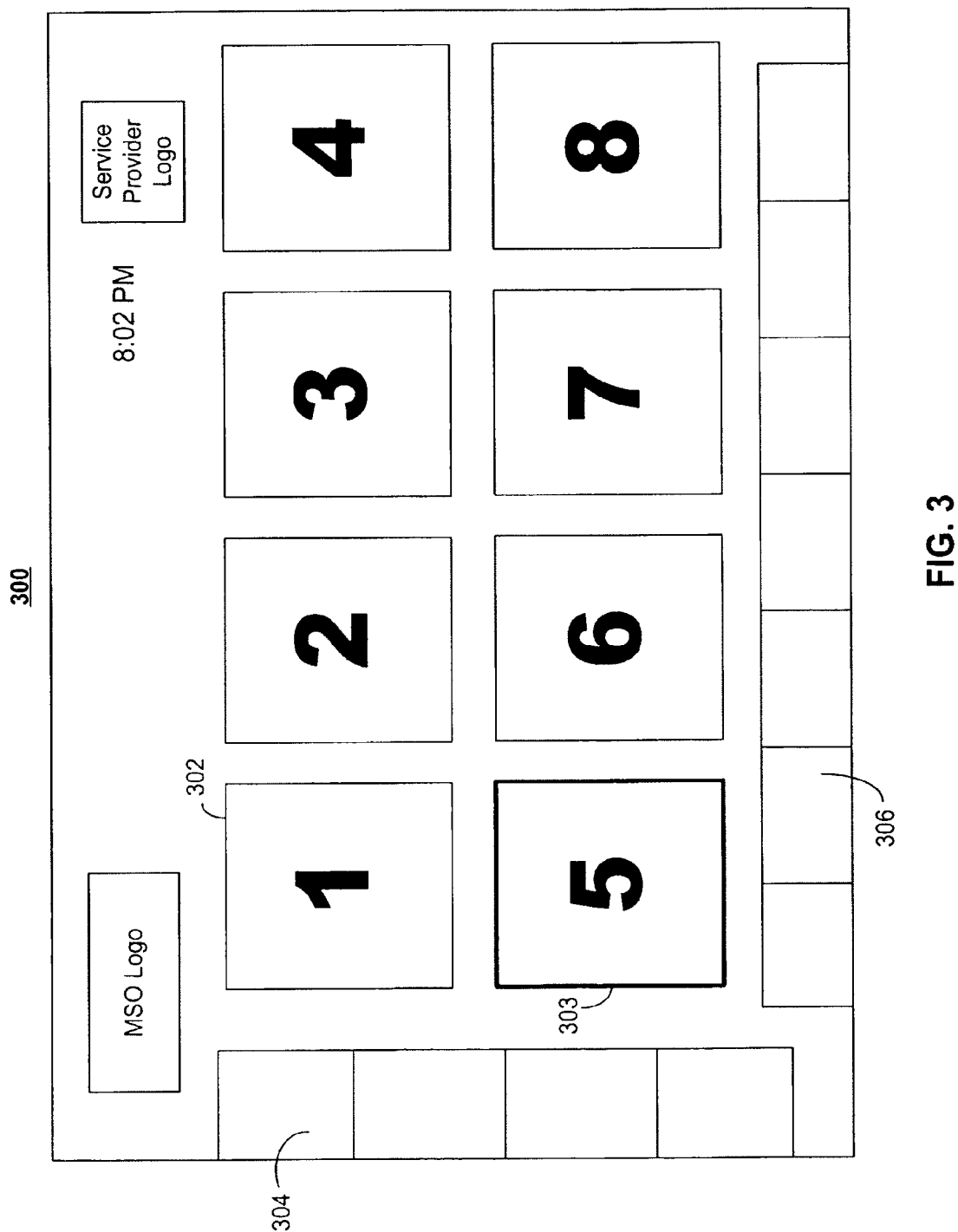
FIG. 3 is an illustrative generic display screen showing a number of video windows, or cells, of a video mosaic page in accordance with one embodiment of the invention.

FIG. 3 shows illustrative generic video mosaic display screen 300. In the example of FIG. 3, screen 300 contains eight numbered cells, or windows. Each of these eight cells may be populated with a different video asset or channel. For example, cell 302 may include full-motion video from channel "225 Cinemax" while cell 303 may contain promotional advertising for new VOD movie releases. Each of the cells in display 300 may be individually selected using input device 38 (FIG. 1). For example, the user may highlight a cell in display 300 using the arrow or cursor keys on a remote control. In the example of FIG. 3, cell 303 is currently highlighted, as shown by the darkened border around the cell. One or more cells may be simultaneously selected, if desired. For example, upon pressing an "OK" key on input device 38 (FIG. 1), the selected status of a cell may toggle on and off. The user may then select one or more additional cells in the same manner.

In some embodiments, a selected subset of cells can be used to form a new custom VRN page. For example, in such embodiments, a user may select cells 302 and 303 from FIG. 3 and then enter a "create custom VRN page" command (e.g., by selecting such a command from an on-screen menu or option button). Other combinations of cell selection as well as selection of cells from a combination of other different custom or system standard VRN screens and/or grid-listed assets are also possible.

The number, location, size, and shape of the cells in display 300 may be altered without departing from the spirit of the invention. As described above, screen data may be used to define the elements in a VRN page. This data may define more or fewer than eight cells and cells of different sizes, positions, and shapes than those shown in FIG. 3.

VRN display screen 300 may also include one or more of vertical option buttons 304 and horizontal option buttons 306. These buttons may link screen 300 to other VRN screens, the main interactive media guidance application screen, or perform any suitable functionality. For example, one button may select all the numbered cells in screen 300, while another button may deselect all the numbered cells in screen 300.

The cells in VRN display screen 300 may be populated with content from similar sources or mixed-mode sources. For example, one cell may contain broadcast television content, while another cell may contain on-demand content. Still another cell may contain local DVR content. The sources of the cells in VRN display screen 300 may be determined by the creator of the VRN page. For example cells 1, 2, 3, and 4 may display video assets that were composited into a multi-video feed remote from the user equipment. The remaining cells (i.e., cells 5, 6, 7, and 8) may be placeholder cells, which are overlaid with video assets at the user equipment device. In some embodiments, the placeholder cells may be overlaid with local content, such as locally-recorded content.

Figure 5:
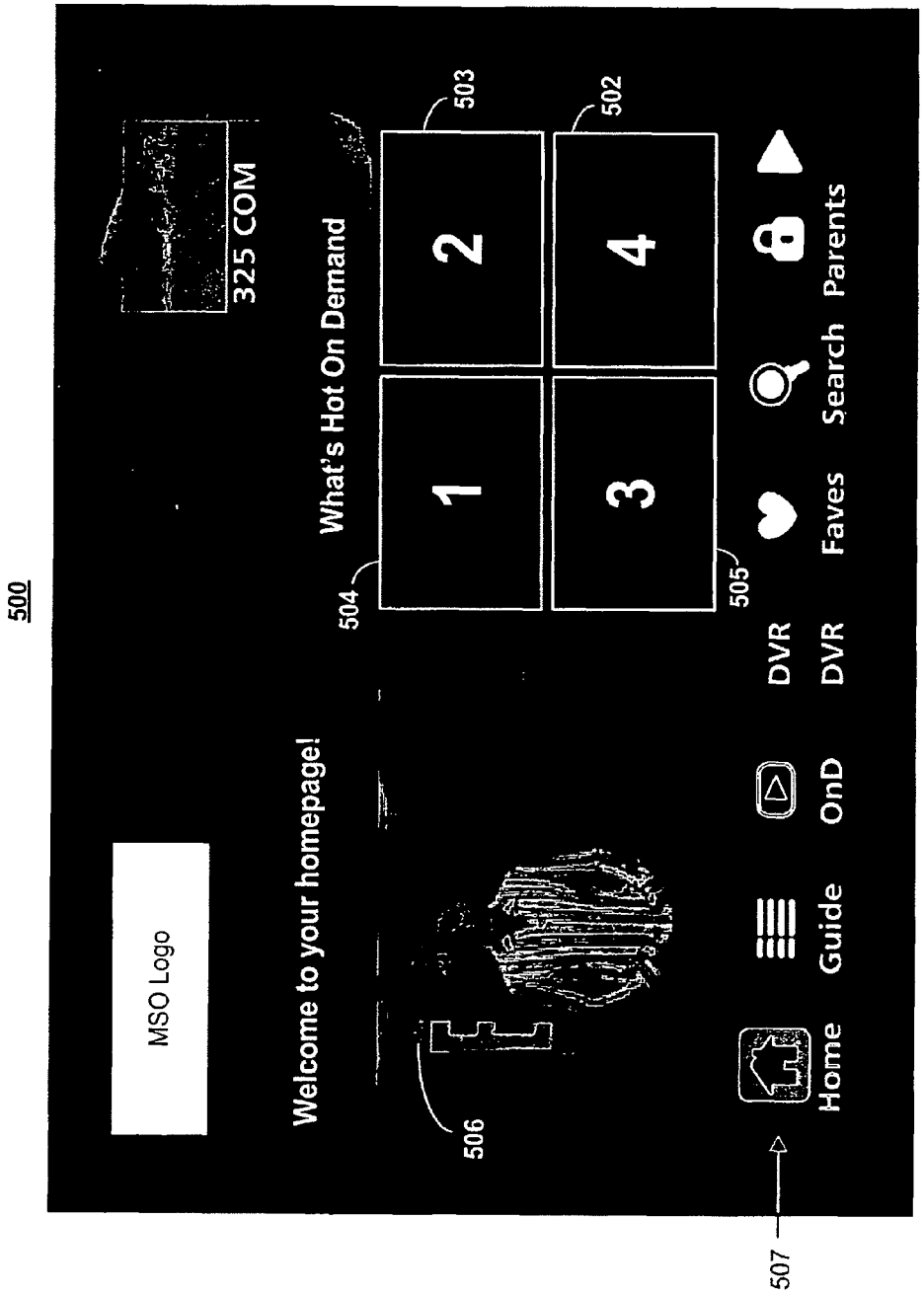
FIG. 5 is an illustrative display screen showing a "what's hot on-demand" video mosaic homepage in accordance with one embodiment of the invention.
Figure 6:
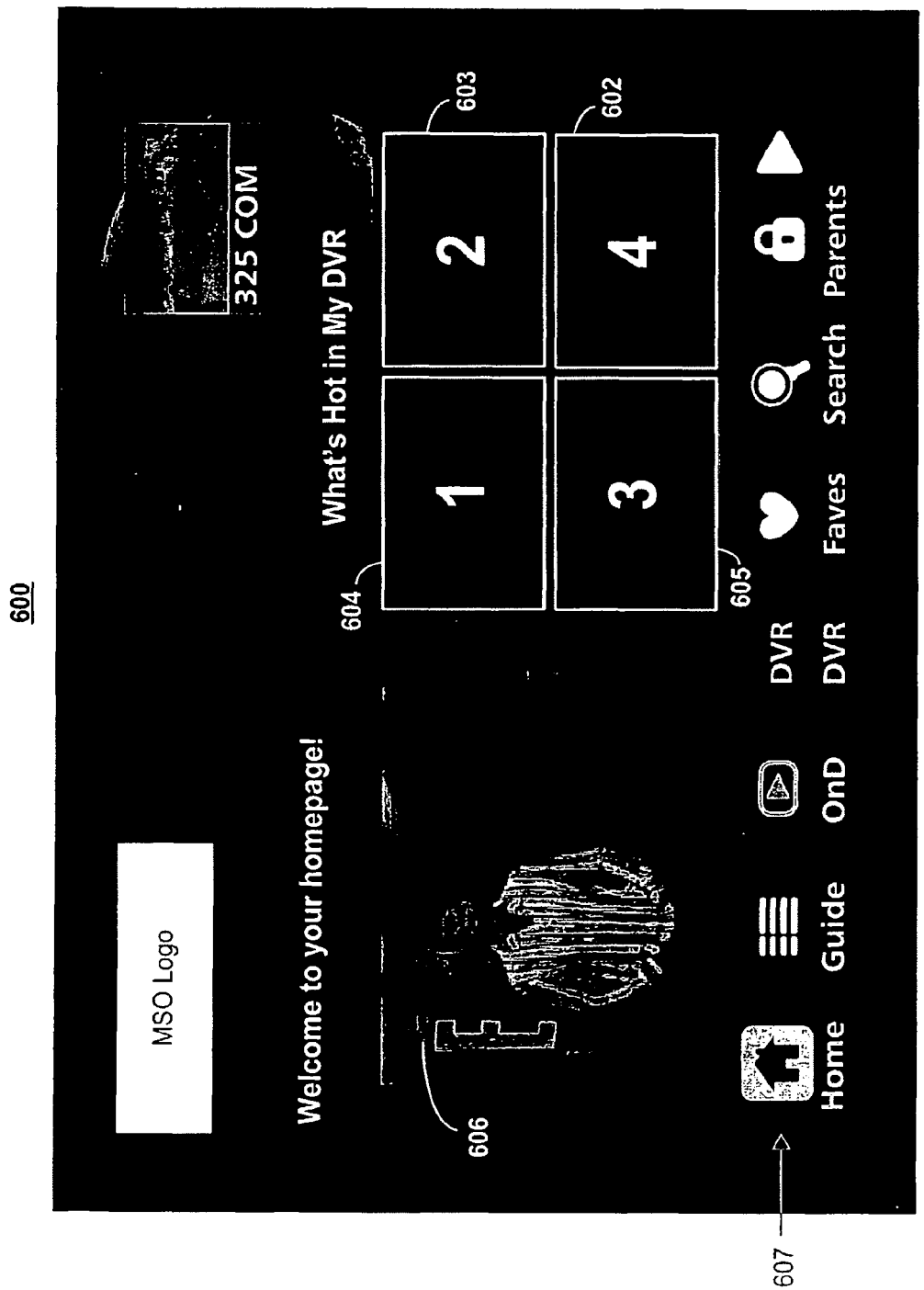
FIG. 6 is an illustrative display screen showing a "what's hot in my DVR" video mosaic homepage in accordance with one embodiment of the invention.
Figure 7:
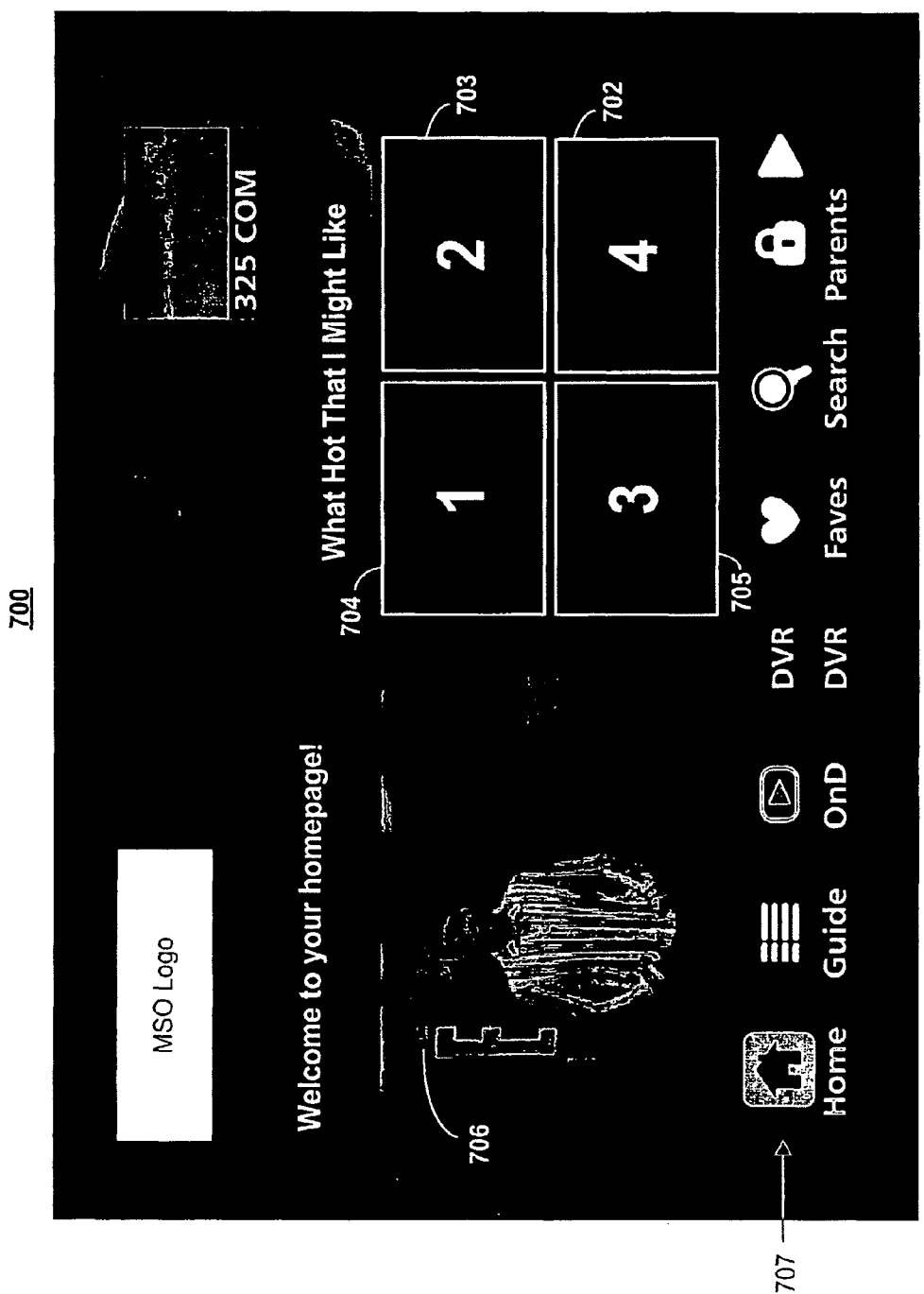
FIG. 7 is an illustrative display screen showing a "what's hot that I might like" video mosaic homepage in accordance with one embodiment of the invention.

FIGS. 4-7 show illustrative VRN homepages 400 (FIG. 4), 500 (FIG. 5), 600 (FIGS. 6), and 700 (FIG. 7). Each of these homepages may be remotely-generated or locally-generated. In some embodiments, VRN pages displaying one or more local assets, such as video loops of content recorded on DVR 220 (FIG. 2), may be locally-generated. Each of homepages 400 (FIG. 4), 500 (FIG. 5), 600 (FIGS. 6), and 700 (FIG. 7) may be accessible through a particular digital television channel. Any of the video cells in the homepages of FIGS. 4-7 may be individually selected using input device 38 (FIG. 1). After selecting a cell, one or more screens of additional information about the asset currently being presented in the selected cell may be displayed. Additionally or alternatively, after selecting any cell in the homepages of FIGS. 4-7, the asset currently being presented in the selected cell may be automatically accessed and presented in full-screen mode. For example, a digital television channel may be tuned, local content may be accessed, or a request for an on-demand asset may be transmitted by the user equipment in response to the user selection of a video cell.

Although homepages 400 (FIG. 4), 500 (FIG. 5), 600 (FIGS. 6), and 700 (FIG. 7) show a number of video cells (including main cells and thumbnail cells), the number, size, and position of these cells may be altered without departing from the spirit of the invention.

Figure 4:
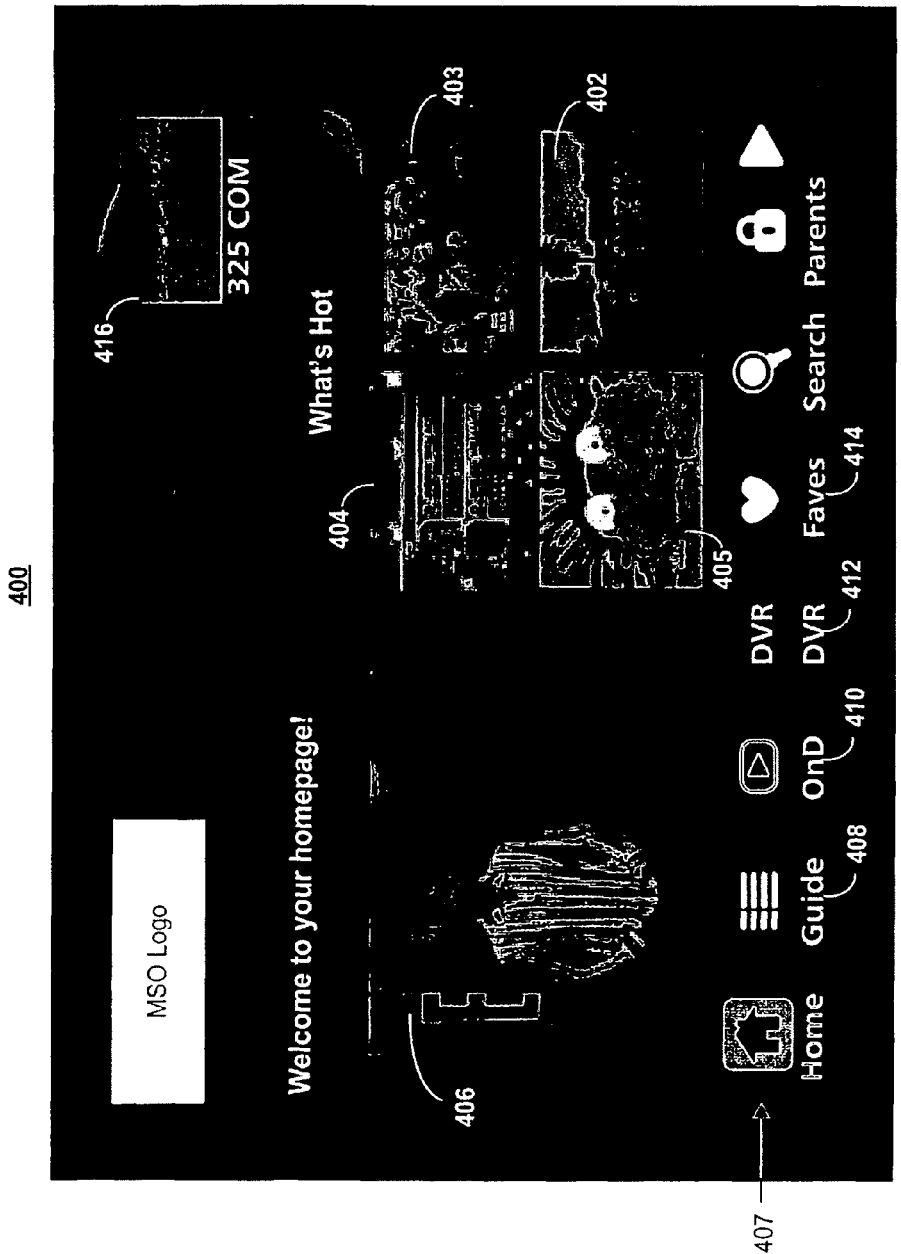
FIG. 4 is an illustrative display screen showing a "what's hot" video mosaic homepage in accordance with one embodiment of the invention.

FIG. 4 shows illustrative "what's hot" VRN homepage 400 in accordance with one embodiment of the invention. A user may be presented with homepage 400 after selecting an appropriate button on input device 38 (FIG. 1). For example, a "Home Page" button may provide direct access to homepage 400. In some embodiments, homepage 400 may be optionally locked, requiring a valid parental control access code input in order to view the page. Homepage 400 may include main cell 406, thumbnail cells 402, 403, 404, and 405, PIP window 416, and option buttons 407. Main cell 406 and thumbnail cells 402, 403, 404, and 405 may both be VRN cells, capable of displaying full-motion video. In some embodiments, main cell 406 is approximately four times larger in size than thumbnail cells 402, 403, 404, and 405.

In the depicted embodiment, thumbnail cells 402, 403, 404, and 405 present video assets from various local and remote sources. For example, thumbnail cell 402 may present a home video recorded to a local recording device, such as DVR 220 (FIG. 2). Thumbnail cell 403 may present, for example, an Internet video clip. Thumbnail cell 404 may present, for example, a broadcast television sporting event, and thumbnail cell 405 may present, for example, an on-demand cartoon.

The selection of video assets to display in thumbnail cells 402, 403, 404, and 405 may be based on a number of criteria. For example, the cells may contain the video assets most recently or most frequently accessed by a user of user equipment 30 (FIG. 2). The cells may also contain the video assets most recently or most frequently accessed by all users of media system 100 (FIG. 1). In some embodiments, VRN client 31 may maintain a listing or database table (not shown) of "hot content," including an identification of local assets (such as recorded programming), broadcast programming, on-demand assets, and Internet assets. The listing of hot content may be specific to a single user of user equipment 30, a group of users of user equipment 30, or a group of user equipment devices in media system 100 (FIG. 1). The assets listed in the listing or table of hot content may include featured assets selected by the MSO or service provider, assets meeting a certain threshold criteria (e.g., assets recently accessed by the user within a certain period of time, assets accessed a certain number of times, or any other suitable criteria), or any combination of the aforementioned assets. The listing or table may be transmitted from central facility 10 (FIG. 1) or distribution facility 20 (FIG. 1) in some embodiments. VRN client 31 may access the listing or record of hot content to determine what content should be presented in thumbnail cells 402, 403, 404, and 405.

If the video feed corresponding to homepage 400 is remotely-generated (i.e., composited remote from the user equipment), some of the video assets presented on the page may be overlaid at the user equipment. For example, if cell 404 corresponds to a locally-recorded content accessible from DVR 220 (FIG. 2), then this video asset may be overlaid in the appropriate location for cell 404. From the user's point of view, whether the page is remotely-generated or locally-generated may be completely transparent to the user.

Option buttons 407 may provide for single-selection access to a variety of commonly-used features. For example, option button 408 may link the user to an interactive media guidance application. Option button 410 may link the user to an on-demand listings screen or VRN page, such as homepage 500 (FIG. 5). Option button 412 may link the user to a DVR listings screen or VRN page, such as homepage 600 (FIG. 6). Option button 414 may link the user to a favorites listings screen or VRN page, such as homepage 700 (FIG. 7).

FIG. 5 shows illustrative "what's hot on-demand" VRN homepage 500. Homepage 500 may be similar to homepage 400 of FIG. 4 and may include main cell 506, thumbnail cells 502, 503, 504, and 505, and option buttons 507. Unlike thumbnail cells 402, 403, 404, and 405 (FIG. 4), which may display content from a variety of different sources, thumbnail cells 502, 503, 504, and 505 may display on-demand assets only. In some embodiments, the assets displayed in thumbnail cells 502, 503, 504, and 505 may be selected by the MSO or service provider. For example, the newest or most popular on-demand releases may be displayed in thumbnail cells 502, 503, 504, and 505. In other embodiments, thumbnail cells 502, 503, 504, and 505 may display on-demand content recently accessed by, or currently bookmarked on, user equipment 30 (FIG. 1).

FIG. 6 shows illustrative "what's hot in my DVR" VRN homepage 600. Homepage 500 may be similar to homepage 400 of FIG. 4 and may include main cell 606, thumbnail cells 602, 603, 604, and 605, and option buttons 607. Unlike thumbnail cells 402, 403, 404, and 405 (FIG. 4), which may display content from a variety of different sources, thumbnail cells 602, 603, 604, and 605 may display locally recorded assets only. For example, in some embodiments, thumbnail cells 602, 603, 604, and 605 may display locally recorded assets recently (or frequently) accessed by user equipment 30 (FIG. 1). Thumbnail cells 602, 603, 604, and 605 may display continuous or looping portions of the locally recorded assets.

For example, MPEG compositing system 218 (FIG. 2) may extract local loops of video from locally recorded assets and optionally store them in memory 224 (FIG. 2) or onto DVR 220 (FIG. 2). The local compositing system may then generate the VRN page locally with one or more of the extracted video loops presented in thumbnail cells 602, 603, 604, and 605. The portion of the locally recorded asset to extract for use in the VRN homepage may be determined by a scene selection algorithm. The algorithm may identify scene changes within a video asset (e.g., by analyzing the video and/or audio components of the asset using an unsupervised segmentation algorithm, motion estimation algorithm, or any other suitable algorithm). In some embodiments, the scene selection algorithm may also use user viewing behavior or preferences to determine which portions of the locally recorded content to extract for use in VRN homepage 600. For example, if a certain portion of a locally recorded video asset (e.g., the user's favorite scene from a movie or favorite replay from a sporting event) is watched more frequently than other portions, this portion may be selected by the scene selection algorithm for extraction. In some embodiments, user preferences, such as a favorite programs list, are accessed in order to determine which locally recorded assets are selected for presentation in VRN homepage 600. VRN homepage 600 may also present the user's four most recently or frequently accessed recordings in thumbnail cells 602, 603, 604, and 605.

FIG. 7 shows illustrative "what's hot that I might like" VRN homepage 700. Homepage 700 may be similar to homepage 400 of FIG. 4 and may include main cell 706, thumbnail cells 702, 703, 704, and 705, and option buttons 707. Like thumbnail cells 402, 403, 404, and 405 (FIG. 4), thumbnail cells 702, 703, 704, and 705 may display content from a variety of different sources (i.e., homepage 700 may be a "mixed-mode" page). For example, cell 702 may display a feature on-demand movie, cell 703 may display a live broadcast television program, cell 704 may display an Internet video, and cell 705 may display a locally recorded video.

The content displayed in thumbnail cells 702, 703, 704, and 705 may be selected based on a number of criteria. For example, the user may create a user profile including the user's favorite genres, sports teams, actors, directors, or any other suitable information. Using the profile data, VRN client 31 (FIG. 2) may select any assets accessible by user equipment 30 (FIG. 1) for display in thumbnail cells 702, 703, 704, and 705 that matches one or more of the user's preferences. The user's profile may also be supplemented with data obtained from active user monitoring. For example, all interaction with user equipment 30 (FIG. 1) may be monitored and optionally logged. The amount of time assets are displayed, the sources of accessed assets, the genres of accessed assets, and any other suitable information may be included in the user's profile. In this way, the user's profile may contain a record of all the assets that have been accessed by the user equipment and the length of time each asset was presented. VRN client 31 (FIG. 1) may use this information when selecting video assets for cells of VRN pages, like VRN homepage 700.

Figure 8A:
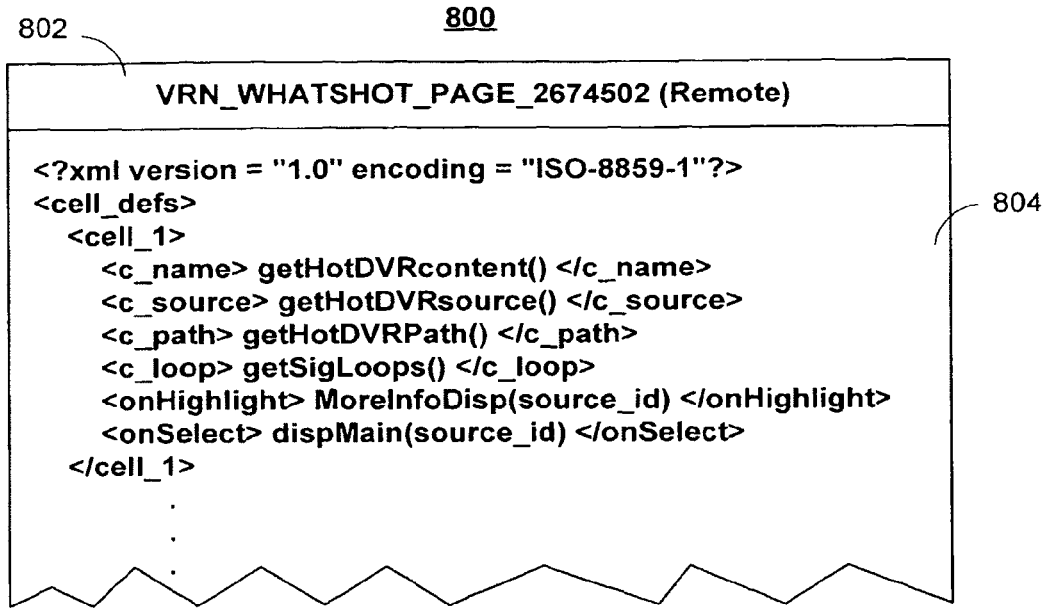
FIG. 8 shows illustrative mark-up language files including cell definition tags in accordance with one embodiment of the invention.
Figure 8B:
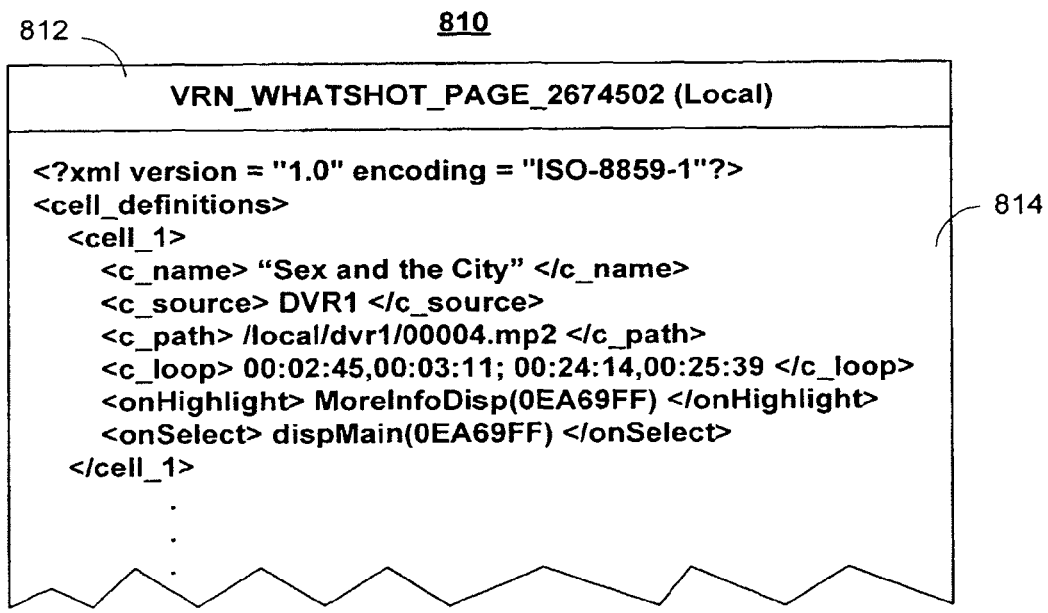

FIGS. 8A and 8B shows illustrative mark-up language files 800 and 810. File 800 may be associated with unique name 802 and one or more mark-up language tags in body 804. Body 804 may include HTML, XML, and/or SGML tags in some embodiments. The tags in body 804 may include cell definitions for all or a subset of cells in a VRN page, such as VRN homepages 400 (FIG. 4), 500 (FIG. 5), 600 (FIGS. 6), and 700 (FIG. 7). As shown in the example of FIG. 8A, an identification of the content to include in cell 1 of the VRN page is provided in the "c_name" tag. This tag references a local function call to be executed on user equipment 30 (FIG. 1). The source of the cell and the local path of the content to display in the cell are provided by the "getHotDVRsource" and "getHotDVRPath" functions, respectively. Body 804 may also include an indication of selected portions of the content to use as video loops in the VRN cell. Finally, body 804 may define action data for the cells in the VRN page, such as response behavior to highlighting or selecting a cell.

FIG. 8B shows mark-up language file 810 associated with unique name 812. File 810 may correspond to the local version of file 800 after being processed by VRN client 31 (FIG. 1). For clarity, the local function calls have been executed and the data returned by the function calls placed inside the appropriate tags. For example, the "getHotDVRPath" function returned the path to a locally recorded asset "/local/dvr1/00004.mp2". Each function call to "getHotDVRPath" may return the path to a different "hot" locally recorded asset, based on the user preference data and monitoring described above. VRN client 31 (FIG. 2) may read the received cell definitions from the mark-up language files to determine the if any placeholder cells exist on the page. If so, VRN client (FIG. 2) may execute the local functions to determine the identity of the video assets to be displayed in the placeholder cells. The VRN client may then overlay the appropriate video assets in the position of the placeholder cells and display the page. More or fewer tags than those defined in body 814 and 804 may be used in other embodiments.

Figure 9:
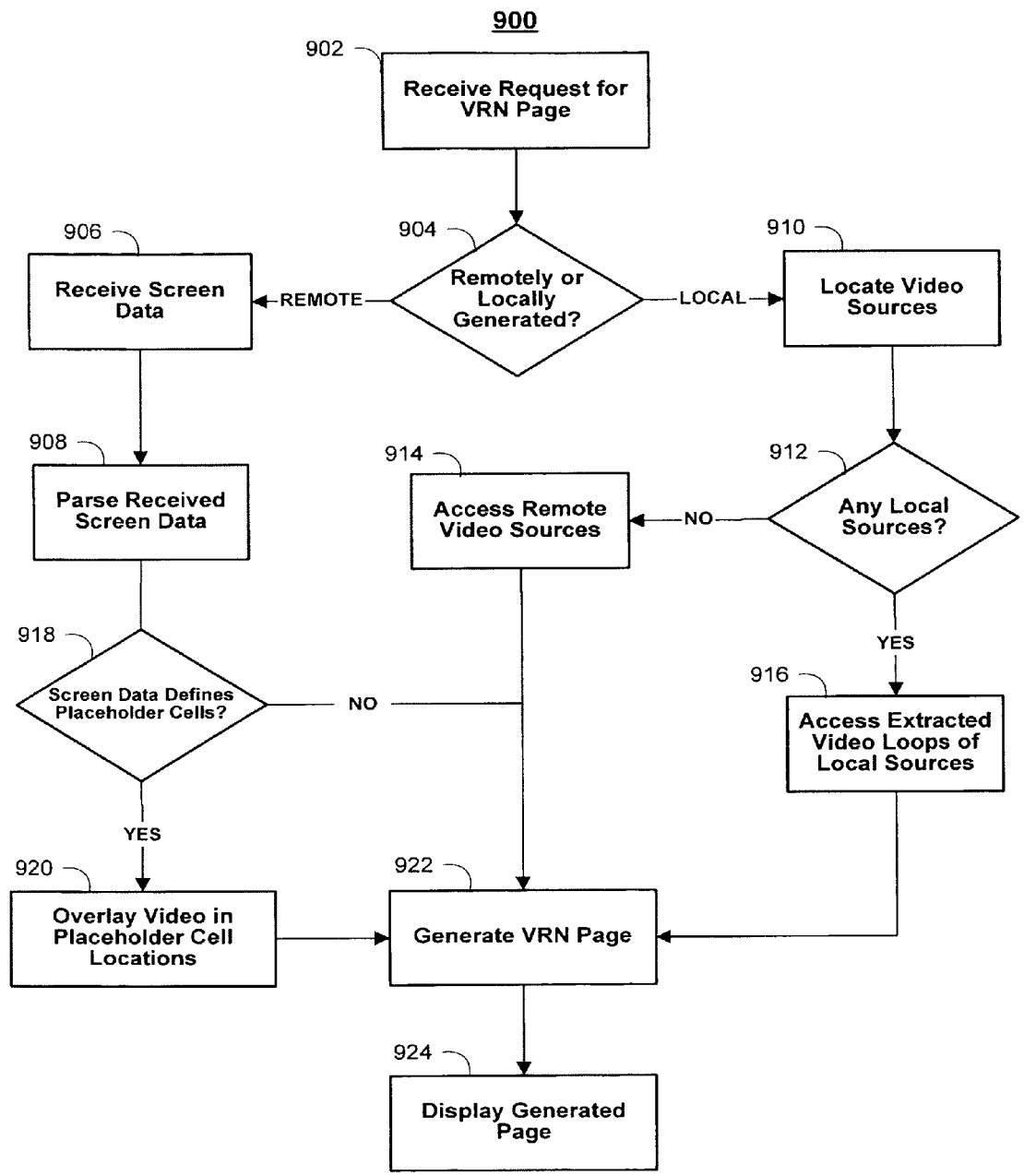
FIG. 9 shows a simplified illustrative process for displaying locally-generated or remotely-generated video mosaic pages in accordance with one embodiment of the invention.

FIG. 9 shows illustrative process 900 for generating a VRN page in accordance with one embodiment of the invention. At step 902, a request is received for a VRN page. For example, the user may press a "Homepage" button on input device 38 (FIG. 1) or tune to a certain digital channel. At step 904, VRN client 31 (FIG. 2) may determine if the requested VRN page is remotely-generated or locally-generated. If the page is remotely-generated, at step 906 screen data may be received for the page. For example, VRN screen data source 14 (FIG. 1) may generate screen data and transmit the generated screen data to distribution facility 20 (FIG. 1). Distribution facility 20 (FIG. 1) may then, in turn, transmit the screen data to user equipment 30 (FIG. 1). The screen data may define user response behaviors for any of the selectable cells in the mosaic page. In addition, one or more placeholder cells may be defined in the screen data. The placeholder cell definition may include an indication of the placeholder cell's size, location (e.g., x and y coordinates) or any other suitable information.

The received screen data is then parsed by VRN client 31 (FIG. 2) at step 908. The VRN client may then determine, at step 918, whether the screen data defines one or more placeholder cells. For example, mark-up language file 800 (FIG. 8) may designate one or more cells as placeholder cells. The screen data may also reference several local function calls for each placeholder cell. These local function calls may return any suitable data or variables on the local user equipment device. For example, file system paths, asset source identifiers, pointers to media assets, or any other suitable information may be returned by the local function calls. At step 920, if the screen data defines a placeholder cell, video is overlaid on the mosaic display in the position of the placeholder cell.

If, at step 904, a determination is made that the VRN page is to be locally-generated, at step 910 VRN client 31 (FIG. 2) may locate the video sources for the requested VRN page. For example, if the user has requested "what's hot in my DVR" homepage 600 (FIG. 6), user profile information (including user monitoring data) may be accessed to determine what assets should populate the cells in the VRN page. At step 912, VRN client 31 (FIG. 2) may determine whether any local sources are selected for inclusion in the VRN page. If the cells do not display any local content, at step 914 the remote video sources may be accessed. If one more of the cells do display local content, an extracted video loop of the content may be accessed at step 916. For example, MPEG compositing system 218 (FIG. 8) may extract selected portions of video from one or more locally recorded assets.

At step 922, the VRN page may be generated. For example, if the page is remotely-generated, all the video sources may be composited at the remote compositing location into a single video feed and displayed in an interactive page, such as the homepages shown in FIGS. 4-7. If the page is remotely-generated, the video feed and any video overlays may be combined into a single display at the user equipment device. In general, the page may be streamed to the source of at least one of the video sources to be displayed in the VRN for further compositing, if desired. The VRN page may then be displayed to the user at step 924. For example, control circuitry 32 (FIG. 1) may cause the page to be displayed on display device 34 (FIG. 1).

In practice, a flexible mix of compositing at the remote location and local compositing may be combined with sourcing video from remote and local sources. As such, one or more steps shown in process 900 may be repeated, combined with other steps, performed in any suitable order, performed in parallel (e.g., simultaneously or substantially simultaneously) or removed. Additionally, in some embodiments, compositing may be done remotely while screen data is generated locally or vice versa.

Figure 10:
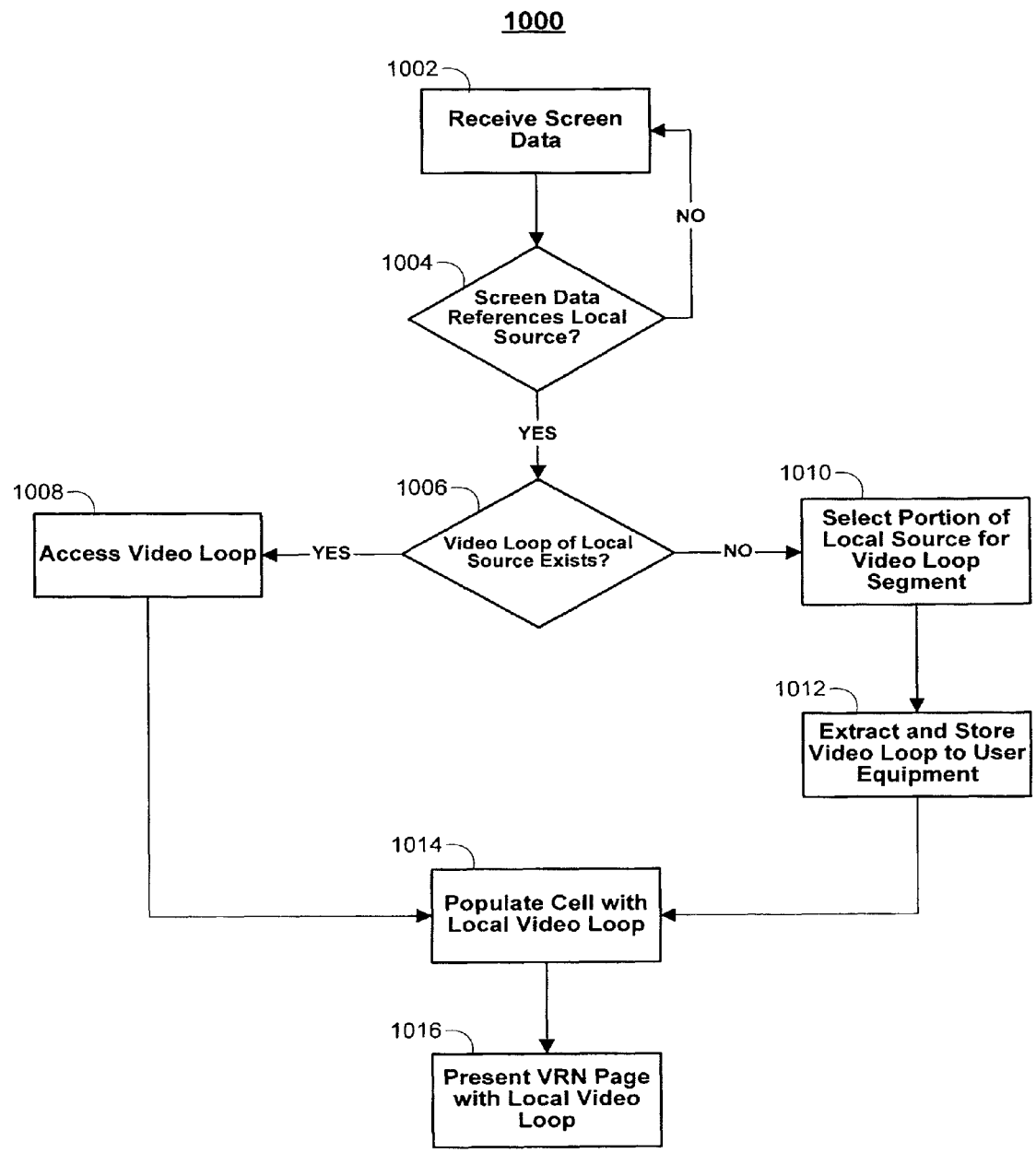
FIG. 10 shows a simplified illustrative process for populating video mosaic cells with extracted portions of local content in accordance with one embodiment of the present invention.

FIG. 10 shows illustrative process 1000 for populating a VRN cell with local content. At step 1002, screen data may be received or generated. If the page is remotely-generated, screen data may be received from a remote location (e.g., distribution facility 20 of FIG. 2). This screen data may define one or more cells of a VRN page. For example, the screen data may include an identification of the source of one or more cells, an identification of the content of one or more cells, action data for responding to user behavior (e.g., the selection of one or more cells), and any other suitable information. At step 1004, VRN client 31 (FIG. 1) may determine if the screen data references any local sources. For example, content stored in DVR 220 (FIG. 2), gaming device 222 (FIG. 2), or memory 224 (FIG. 2) may be referenced by the screen data. In lieu of actually referencing a local source, a local function call may return a local source, as described above.

If, at step 1004, the screen data references a local source, a determination is made at step 1006 whether a video loop of the local source exists on the user equipment. If a local video loop does exist, it may be accessed at step 1008. If a local video loop does not exist, a portion of the local source may be selected for a video loop segment at step 1010. For example, a scene selection algorithm may be used in some embodiments to identify new or changing scenes within a video asset. The scene selection algorithm may also access user profile information to determine what portion to select for the video loop segment. For example, the scene selection algorithm may select a more frequently watched portion of a video asset, if one exists, for the video loop segment.

At step 1012, the selected portion of video may be extracted from the video asset and stored to the user equipment device. For example, MPEG compositing system 218 (FIG. 2) may extract the selected portion and store it as an MPEG-2 file in memory 224 (FIG. 2) or on DVR 220 (FIG. 2). At step 1014, the VRN page may be rendered with the local video loop overlaid in the position of a video cell, such as thumbnail cell 402, 403, 404, or 405 (FIG. 4). Finally, at step 1016, the VRN page may be displayed with the local video loops to the user.

In practice, one or more steps shown in process 1000 may be repeated, combined with other steps, performed in any suitable order, performed in parallel (e.g., simultaneously or substantially simultaneously) or removed.

Figure 11:
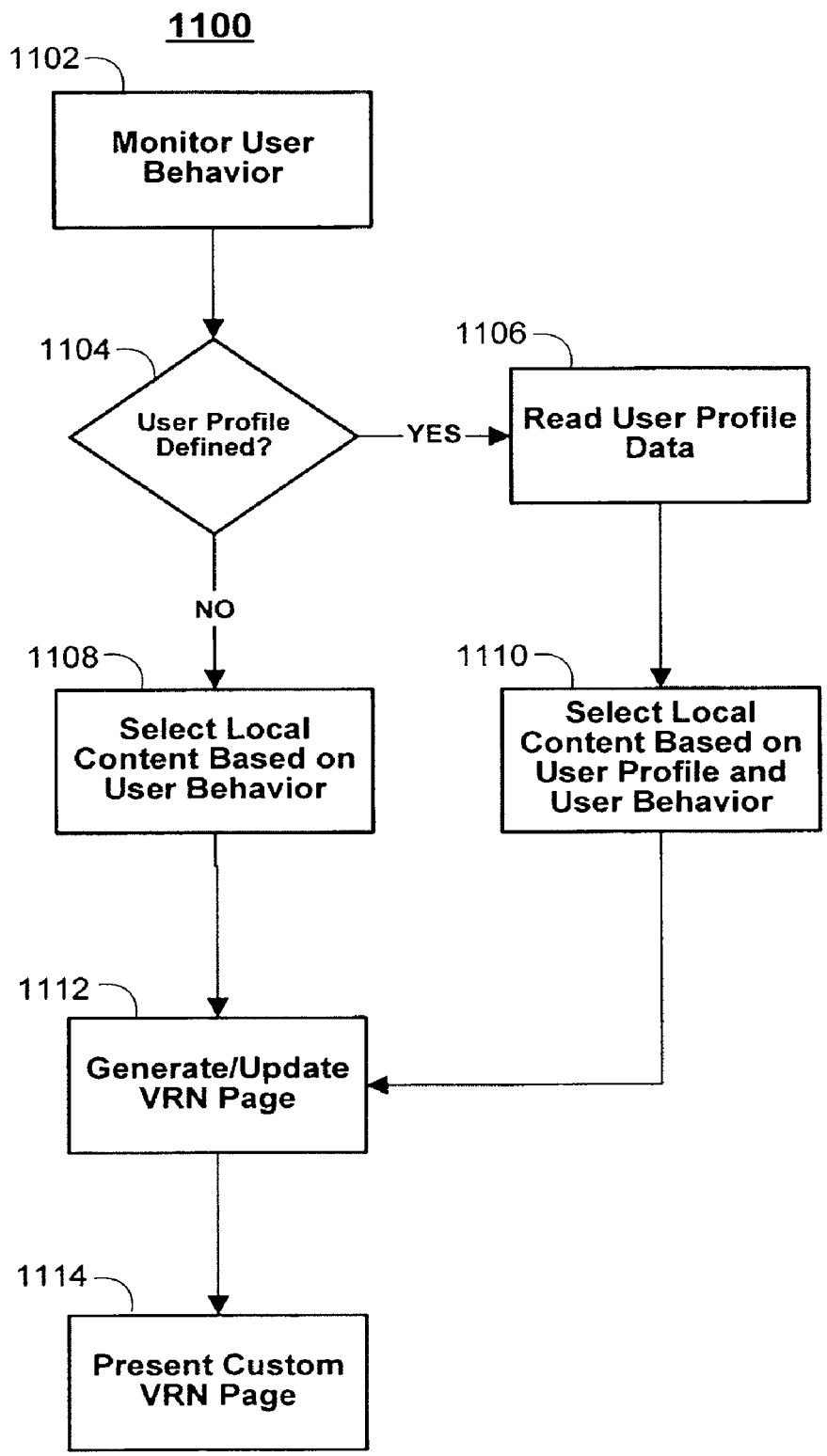
FIG. 11 shows a simplified illustrative process for monitoring user behavior and displaying custom video mosaic pages in accordance with one embodiment of the present invention.

FIG. 11 shows illustrative process 1100 for presenting a custom VRN page based on user profile information, user monitoring, or both. At step 1102, user behavior is monitored and optionally logged to the user equipment. For example, some application process implemented on user equipment 30 may monitor all interaction with the user equipment, including content access requests, frequently watched programs and genres, and any other suitable characteristics. In addition, the user may have a profile saved to the user equipment. If a user profile is defined at step 1104, the profile data is read at step 1106. This profile data may include various content preferences for the user. For example, the user may select his or her favorite program, sports team, actor, director, genre, or any other suitable preference.

After reading the user profile data at step 1106, local content may be selected for display in one or more custom VRN pages at step 1110. The content selected may be based on both user profile data and user behavior. If a user profile is not defined for the current user at step 1104, local content may be selected for presentation in one or more custom VRN pages at step 1108 based on monitored user behavior. For example, VRN homepage 400 (FIG. 4) may include local content recently or frequently accessed by the user in one or more of thumbnail cells 402, 403, 404 and 405 (FIG. 4).

At step 1112, the VRN page is generated or updated. For example, MPEG compositing system 218 (FIG. 2) may extract video loops of local content as described above. VRN client 31 (FIG. 2) may then swap out one or more VRN cells with the new local content selections. In this way, the user may be presented with custom VRN pages including one or more cells of local content that are particularly relevant to the user. Each time the custom page is displayed, new video assets may be presented in the page, depending on the user's viewing habits, preferences, and user monitoring information.

In practice, one or more steps shown in process 1100 may be repeated, combined with other steps, performed in any suitable order, performed in parallel (e.g., simultaneously or substantially simultaneously) or removed.

The above described embodiments of the invention are presented for purposes of illustration and not of limitation, and the present invention is limited only by the claims which follow.

What is claimed is:

1. A method for displaying a video mosaic page on a user equipment device, the method comprising:
   receiving a video feed comprising a plurality of video assets for display in a video mosaic page;
   receiving, from a remote server, screen data that defines at least one video cell in the video mosaic page for at least one of the plurality of video assets, a placeholder video cell in the video mosaic page, and an action to be performed in response to a user selection of the placeholder video cell;

selecting, with the user equipment device, local video content, stored on the user equipment device, based on a cell definition received in the screen data, wherein the cell definition uniquely identifies the local video content;

overlaying the local video content on a position corresponding to the placeholder video cell; and displaying the plurality of video assets and the local video content in an interactive display.

2. The method of claim 1 wherein the action to be performed in response to a user selection of the placeholder video cell is selected from the group consisting of tuning to a video asset, displaying more information, displaying an advertisement, setting a reminder, and recording a program.

3. The method of claim 1 further comprising:
receiving a user selection of one of the plurality of video assets in the interactive display; and
displaying the selected video asset in full-screen mode in response to receiving the user selection.

4. The method of claim 1 further comprising monitoring user interaction with the user equipment device and saving user interaction information to a user profile.

5. The method of claim 4 further comprising selecting the local video content based on the user interaction information in the user profile.

6. The method of claim 4 further comprising saving user viewing preferences to the user profile.

7. The method of claim 6 further comprising selecting the local video content based on the user interaction information and the user viewing preferences in the user profile.

8. The method of claim 1 wherein overlaying local video content comprises extracting a video loop from the local video content and overlaying the extracted video loop.

9. The method of claim 8 further comprising selecting a specific portion of the local video content for the extracting using a scene change algorithm.

10. The method of claim 9 where the scene change algorithm is selected from the group consisting of an unsupervised segmentation algorithm and a motion estimation algorithm.

11. The method of claim 1 wherein the plurality of video assets are selected from the group consisting of broadcast video assets, multicast video assets, on-demand video assets, pay-per-view video assets, and Internet video assets.

12. The method of claim 1 wherein the local video content is selected from the group consisting of locally-recorded video, games, interactive applications, and videophone messages.

13. The method of claim 1 wherein the screen data defines the size or the position of the placeholder cell in the video mosaic page.

14. The method of claim 1 wherein the video feed comprises a remotely composited video that was composited by a compositing facility that is remote from the user equipment device, the composited video comprising two or more component videos wherein at least one of the component videos is sourced by the user equipment device to the remote compositing facility.

15. The method of claim 1 wherein the video feed comprises a video multiplex with the plurality of video assets multiplexed together, wherein each video asset is carried in a separate video stream that is distinct from the other video streams and wherein the number of pixels of each video asset corresponds to less than 80% of those that would nominally fill the entire display of the user equipment device.

16. The method of claim 15 further comprising decompressing at least one of the plurality of video assets and compositing the decompressed video assets with the local video content, wherein the position of the composited local video content corresponds to the position of the placeholder video cell.

17. A system for displaying a video mosaic page on a user equipment device, the system comprising:
a memory for storing local video content, on the user equipment device; and
control circuitry configured to:
receive a video feed comprising a plurality of video assets for display in a video mosaic page;
receive, from a remote server, screen data that defines at least one video cell in the video mosaic page for at least one of the plurality of video assets, a placeholder video cell in the video mosaic page, and an action to be performed in response to a user selection of the placeholder video cell;
select, with the user equipment device, the local video content based on a cell definition received in the screen data, wherein the cell definition uniquely identifies the local video content;
overlay the local video content on a position corresponding to the placeholder video cell; and
display the plurality of video assets and the local video content in an interactive display.

18. The system of claim 17 wherein the action to be performed in response to a user selection of the placeholder video cell is selected from the group consisting of tuning to a video asset, displaying more information, displaying an advertisement, setting a reminder, and recording a program.

19. The system of claim 17 wherein the control circuitry is further configured to:
receive a user selection of one of the plurality of video assets in the interactive display; and
display the selected video asset in full-screen mode in response to receiving the user selection.

20. The system of claim 17 wherein the control circuitry is further configured to monitor user interaction with the user equipment device and save user interaction information to a user profile.

21. The system of claim 20 wherein the control circuitry is further configured to select the local video content based on the user interaction information in the user profile.

22. The system of claim 20 wherein the control circuitry is further configured to save user viewing preferences to the user profile.

23. The system of claim 22 wherein the control circuitry is further configured to select the local video content based on the user interaction information and the user viewing preferences in the user profile.

24. The system of claim 17 wherein the control circuitry is configured to overlay local video content by extracting a video loop from the local video content and overlaying the extracted video loop.

25. The system of claim 24 wherein the control circuitry is further configured to select a specific portion of the local video content for the extracting using a scene change algorithm.

26. The system of claim 25 where the scene change algorithm is selected from the group consisting of an unsupervised segmentation algorithm and a motion estimation algorithm.

27. The system of claim 17 wherein the plurality of video assets are selected from the group consisting of broadcast video assets, multicast video assets, on-demand video assets, pay-per-view video assets, and Internet video assets.

28. The system of claim 17 wherein the local video content is selected from the group consisting of locally-recorded video, games, interactive applications, and videophone messages.

29. The system of claim 17 wherein the screen data defines the size or the position of the placeholder cell in the video mosaic page.

30. The system of claim 17 wherein the video feed comprises a remotely composited video that was composited by a compositing facility that is remote from the user equipment device, the composited video comprising two or more component videos wherein at least one of the component videos is sourced by the user equipment device to the remote compositing facility.

31. The system of claim 17 wherein the video feed comprises a video multiplex with the plurality of video assets multiplexed together, wherein each video asset is carried in a separate video stream that is distinct from the other video streams and wherein the number of pixels of each video asset corresponds to less than 80% of those that would nominally fill the entire display of the user equipment device.

32. The system of claim 31 wherein the control circuitry is further configured to decompress at least one of the plurality of video assets and composite the decompressed video assets with local video content, wherein the position of the composited local video content corresponds to the position of the placeholder video cell.

* * * * *